US012109586B2

(12) United States Patent
Soleymani et al.

(10) Patent No.: US 12,109,586 B2
(45) Date of Patent: Oct. 8, 2024

(54) OMNIPHOBIC SURFACES WITH HIERARCHICAL STRUCTURES, AND METHODS OF MAKING AND USES THEREOF

(71) Applicant: McMaster University, Hamilton (CA)

(72) Inventors: Leyla Soleymani, Oakville (CA); Roderick Maclachlan, Hamilton (CA); Sara Moetakef Imani, Hamilton (CA); Yuting Chan, Chao Chu Kang (SG); Tohid Didar, Dundas (CA)

(73) Assignee: MCMASTER UNIVERSITY, Hamilton (CA)

( * ) Notice: Subject to any disclaimer, the term of this patent is extended or adjusted under 35 U.S.C. 154(b) by 0 days.

(21) Appl. No.: 17/616,374

(22) PCT Filed: Jun. 3, 2020

(86) PCT No.: PCT/CA2020/050766
§ 371 (c)(1),
(2) Date: Dec. 3, 2021

(87) PCT Pub. No.: WO2020/243833
PCT Pub. Date: Dec. 10, 2020

(65) Prior Publication Data

US 2022/0323993 A1 Oct. 13, 2022

Related U.S. Application Data

(60) Provisional application No. 62/856,392, filed on Jun. 3, 2019.

(51) Int. Cl.
*B05D 5/00* (2006.01)
*B05D 3/02* (2006.01)
(Continued)

(52) U.S. Cl.
CPC ........... *B05D 5/083* (2013.01); *B05D 3/0254* (2013.01); *B05D 3/066* (2013.01); *B05D 2506/10* (2013.01); *B05D 2518/10* (2013.01)

(58) Field of Classification Search
CPC ...... B05D 5/083; B05D 3/0254; B05D 3/066; B05D 2506/10; B05D 2518/10
See application file for complete search history.

(56) References Cited

U.S. PATENT DOCUMENTS

2007/0141114 A1* 6/2007 Muisener ............. C09D 5/1681 427/2.24
2009/0011222 A1 1/2009 Xiu et al.
(Continued)

FOREIGN PATENT DOCUMENTS

CN 105518120 A 4/2016
CN 106752899 A 5/2017
(Continued)

OTHER PUBLICATIONS

International Search Report and Written Opinion of WO 2020243833 dated Sep. 18, 2020.
(Continued)

*Primary Examiner* — Hai Y Zhang
(74) *Attorney, Agent, or Firm* — Bereskin & Parr LLP/S.E.N.C.R.L., s.r.l.; Luba Naiberger

(57) ABSTRACT

This application relates to omniphobic materials which are physically and chemically modified at their surface to create hierarchically structured materials with both nanoscale and microscale structures that provide the omniphobic properties. Methods of making such omniphobic surfaces with hierarchical structures and uses thereof, including as flexible films that repel contaminants are also disclosed in the application.

12 Claims, 10 Drawing Sheets

(51) Int. Cl.
*B05D 3/06* (2006.01)
*B05D 5/08* (2006.01)

(56) References Cited

U.S. PATENT DOCUMENTS

| | | | | |
|---|---|---|---|---|
| 2012/0300282 | A1* | 11/2012 | Bower | G02B 26/004 359/290 |
| 2013/0216784 | A1 | 8/2013 | Zhang et al. | |
| 2013/0309450 | A1 | 11/2013 | Khine et al. | |
| 2015/0273733 | A1 | 10/2015 | Zhang et al. | |
| 2016/0158969 | A1 | 6/2016 | McLane et al. | |
| 2017/0204279 | A1 | 7/2017 | Larimer et al. | |
| 2018/0297321 | A1 | 10/2018 | Jin et al. | |
| 2019/0154622 | A1 | 5/2019 | Gabardo et al. | |

FOREIGN PATENT DOCUMENTS

| | | | |
|---|---|---|---|
| CN | 107150020 | A | 9/2017 |
| DE | 102014119233 | A1 | 6/2016 |
| WO | 2015020818 | A1 | 2/2015 |

OTHER PUBLICATIONS

Imani et al., "Flexible hierarchical wraps repel drug-resistant gram-negative and positive bacteria", 2020, ACS Nano, vol. 14, pp. 454-465.

Nokes et al., "Nanotextured shrink wrap superhydrophobic surfaces by argon plasma etching", Materials, 2016, vol. 9, 196, pp. 1-11.

Manna et al., "Shrink to fit superhydrophobicity: thermally-induced microscale wrinkling of thin hydrophobic multilayers fabricated on flexible shrink-wrap subtsrates", Advanced Mater., 2013, vol. 25, pp. 3085-3089.

Drame et al., "Superhydrophobic and oleophobic surfaces containing wrinkles and nanoparticles of PEDOT with two short fluorinated chains", 2014, RSC Advances, vol. 4, pp. 10935-10943.

Freschauf et al., "Shrink-induced superhydrophobic and antibacterial surfaces in consumer plastics", 2012, Plos One, vol. 7, pp. 1-7.

Jiang et al., "Superhydrophobic polytetrafluoroethylene/heat-shrinkable polyvinyl chloride composite film with super anti-icing property", 2019, Polymers, vol. 11, pp. 1-14.

Lin et al., "Simultaneous Formation of a Self-Wrinkled Surface and Silver Nanoparticles on a Functional Photocuring Coating", Langmuir 2015, 31, 11800-11808.

* cited by examiner

OMNIPHOBIC SURFACES WITH HIERARCHICAL STRUCTURES, AND METHODS OF MAKING AND USES THEREOF

RELATED APPLICATIONS

This application is a National Stage of International Application No. PCT/CA2020/050766 filed on Jun. 3, 2020 which claims the benefit of priority from U.S. Provisional Patent Application No. 62/856,392 filed on Jun. 3, 2019, the contents of both of which are incorporated herein by reference in their entirety.

FIELD

The present application relates to the field of surface engineering. In particular, the present application relates to omniphobic surfaces with hierarchical structures and methods of making and uses thereof.

BACKGROUND

Flexible omniphobic surfaces having a high contact angle (>150°) and a low sliding angle (<5°) for water and low surface tension liquids are highly desirable since they can be applied onto substrates having a wide range of surfaces with various form factors to repel liquid contaminants. The liquid repellency of omniphobic surfaces can be translated to anti-biofouling properties, which makes them suitable for use in medical devices, common surfaces, self-cleaning surfaces, and food packaging (1-3). Specifically, omniphobic surfaces significantly reduce bacterial contamination and biofilm formation on surfaces, reducing the risk for spreading infections. Additionally, these surfaces are used in reducing blood adhesion and thrombogenicity in medical devices that interface with human tissues (4-10). Lubricant-infused surfaces (LIS) are a newly developed class of omniphobic surfaces, which demonstrate anti-biofouling properties and extremely low adhesion towards liquids with various surface tensions (11-15). In spite of this, for LIS to sustain their repellency, their lubricant layer should remain intact throughout use, making them inapplicable to dry, open air, or in-operando conditions involving flow, washing, or potential cycling where there is a potential for lubricant leaching (16), greatly limiting the applications in which LIS omniphobic surfaces can be used.

To overcome the practical limitations of liquid-infused surfaces, hierarchically-organized microscale and nanoscale structures can be used to create re-entrant textures for developing high performance omniphobic surfaces without the use of lubricant, due to the entrapment of air pockets within the structures (Cassie state) (17-22), with water and hexadecane contact angles as high as 173.1 and 174.4 respectively (23-27). However, several of the fabrication methods that are currently used for developing hierarchical omniphobic surfaces rely on processes such as photolithography (28), emulsion templating (29), electrospinning (28), reactive ion etching (26), and electrochemical etching/anodizing (30), which are difficult to scale up for use in large area and high volume applications (31). Alternatively, methods such as laser ablation (32) and microfluidic emulsion templating (29) are used to solve the scalability challenges that are involved in fabricating textured omniphobic surfaces. However, the physical and chemical processing steps involved in these methods are not compatible with the fabrication of flexible film surfaces that can be universally applied to a wide range of substrate surfaces of various form, as a thin plastic wrap (31).

Wrinkling is a bottom up fabrication process that can be used to create tunable microscale and nanoscale features (33-35), which involves applying strain to a shape memory polymer substrate modified with a stiff layer (33,36-39). This process can be used to create surfaces with hierarchical structures that can be superhydrophobic (water contact angle of >163°) (37) and oleophobic (hexadecane contact angle>101°) (40) with sliding angles below 5° (37). The challenge in applying these wrinkled surfaces as a flexible omniphobic film/wrap is that, to date, the stiff layer needed for creating wrinkles has been deposited using techniques such as sputtering, spin coating (36), and electrodeposition (40), which are not applicable to the large area and high volume manufacturing in fabricating flexible thin films that can be used as plastic wrap.

SUMMARY

The present application discloses shrinkable polymeric materials having omniphobic surfaces with hierarchical structures, which can be applied to a wide range of substrates of various forms and flexibility, including plastic wrapping material. The hierarchical structures—having both nanoscale and microscale features—provide a surface with robust omniphobicity without the use of lubricant, which can be made using a scalable all solution-based fabrication method that is suitable for industrial settings. Also disclosed are materials in which a patterning in the hierarchical structures is introduced to create, for example, hydrophilic or dual hydrophobic-hydrophilic wells useful as tools for assays.

Briefly, polymeric materials can be activated, for example, using Ultraviolet-Ozone (UVO) treatment, deposited with nanoparticles to provide the nanoscale features and then heated to produce wrinkled microscale features that form the hierarchical structures that provide surface omniphobicity. Prior to the wrinkling, the surfaces may also be subjected to chemical modification with an omniphobic molecule, such as a fluorosilane, which reduces the surfaces energy to further increase the omniphobicity.

Accordingly, the present application includes material comprising a substrate, at least one nanoparticle layer on at least a portion of the substrate and at least one omniphobic molecular layer on the nanoparticle layer.

The present application also provides a material having a surface with hierarchical structures comprising a shrinkable polymer substrate with microscale wrinkling, a plurality of nanoparticles deposited on the substrate and a fluorosilane layer deposited on the substrate having a plurality of nanoparticles wherein the surface exhibits omniphobic properties.

Also included in the present application is a material comprising a substrate, at least one nanoparticle layer on at least a portion of the substrate and at least one omniphobic molecular layer on the nanoparticle layer, wherein the material comprises microstructured and nanostructured wrinkles, and the portion of the substrate comprising the at least one nanoparticle layer and at least one omniphobic molecular layer form hierarchical structures that are omniphobic.

In some embodiments, the present application also includes a material comprising a substrate, at least one nanoparticle layer on at least a portion of the substrate and at least one omniphobic molecular layer on the nanoparticle layer. In some embodiments, this material is applied to a device or article and is wrinkled. In some embodiments, the wrinkling is by heat shrinking and the heat shrinking molds or seals the material to the article or device. In some embodiments, the wrinkling causes the formation of microstructures and nanostructures in the material.

In an embodiment, the material comprises a plurality of portions with hierarchical structures and the plurality of portions are arranged in a pattern.

In some embodiments, the material further comprises an adhesion-promoting layer between the substrate and the at least one nanoparticle layer and/or between the at least one nanoparticle layer and the at least one omniphobic molecular layer.

In some embodiments, the substrate is a polymer substrate. In some embodiments, the polymer substrate is a shrinkable polymer substrate.

In some embodiments, the omniphobic molecular layer is a fluorosilane layer.

In some embodiments, the material comprises microstructured and/or nanostructured wrinkles.

In an embodiment, the surfaces or substrates with hierarchical structures show repellency towards high surface tension (e.g. water) and low surface tension (e.g. hexadecane) liquids by measuring contact and sliding angles. In a further embodiment, the surfaces with hierarchical structures demonstrate hydrophobicity and oleophobicity with water contact angle of above 150°, hexadecane contact angle of above 110°, and sliding angles as low as below 5°. Such omniphobic properties were not observed using unmodified polymer substrates or polymer surfaces that were only either microstructured or nanostructured.

In an embodiment, the omniphobic surfaces with hierarchical structures demonstrated repellency in blood adherence, biofilm formation, and bacterial attachment assays. In an embodiment, the omniphobicity of the hierarchically structured surfaces can be translated to improved anti-biofouling properties.

In an embodiment, the material comprises a flexible film that can be used as plastic packaging wrap that can be placed on a wide range of surfaces to repel liquids with various surface tensions, reduce blood adhesion, and decrease bacterial contamination.

The present application also provides a method of fabricating a material having a surface with hierarchical structures comprising activating a polymer substrate by oxidation of a surface layer, depositing a plurality of nanoparticles on the activated surface, coating the surface with a fluorosilane to create at least one fluorosilane monolayer and heat-shrinking the material to wrinkle the surface wherein the resultant surface exhibits omniphobic properties.

In another aspect, the present application includes a method of fabricating a material having a surface with hierarchical structures comprising:

a) activating a substrate by oxidation of a surface layer,
b) depositing a plurality of nanoparticles on the activated surface to form at least one nanoparticle layer on at least a portion of the substrate,
c) coating the surface with an omniphobic molecule to create at least one omniphobic molecular layer, and
d) treating the material to form wrinkles, wherein the resultant surface exhibits omniphobic properties.

In some embodiments, the method comprises all-solution processing that is amenable to large area applications and large volume manufacturing, opening the door for its application to a wide range of surfaces that have a risk of being in contact with liquid-borne contaminants.

The present application also includes a method of preventing, reducing, or delaying adhesion, adsorption, surface-mediated clot formation, or coagulation of a biological material onto a device in contact therewith, comprising:

providing the device comprising a low adhesion surface having a substrate, at least one nanoparticle layer on the substrate and at least one omniphobic molecular layer on the nanoparticle layer, wherein the surface comprises microstructured and nanostructured wrinkles, and the substrate comprising the at least one nanoparticle layer and at least one omniphobic molecular layer form hierarchical structures that are omniphobic;

and contacting the biological material to the low-adhesion surface.

The present application also includes a device for preventing, reducing, or delaying adhesion, adsorption, surface-mediated clot formation, or coagulation of a biological material in contact therewith, comprising a low adhesion surface having a substrate, at least one nanoparticle layer on the substrate and at least one omniphobic molecular layer on the nanoparticle layer, wherein the surface comprises microstructured and nanostructured wrinkles, and the substrate comprising the at least one nanoparticle layer and at least one omniphobic molecular layer form hierarchical structures that are omniphobic, wherein the biological material is repelled from the surface.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

The embodiments of the application will now be described in greater detail with reference to the attached drawings in which.

Figure 4:
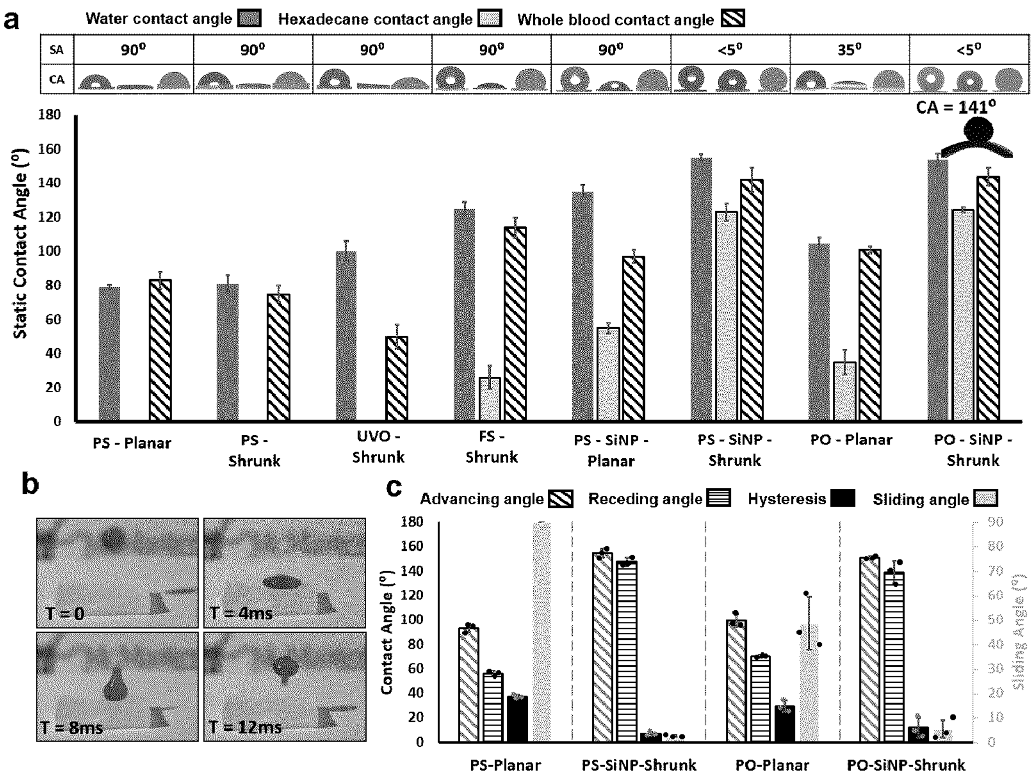

FIG. 4 shows surface repellency and assessment of omniphobicity through a) static contact angle measurements (using water, hexadecane, and blood as test liquids), b) slow-motion images of bouncing of water droplets (10 μL droplet on PS-SiNP-Shrunk at 4 ms intervals), and c) advancing and receding contact angles, contact angles hysteresis, and calculated sliding angle in exemplary embodiments of the application.

Figure 5:
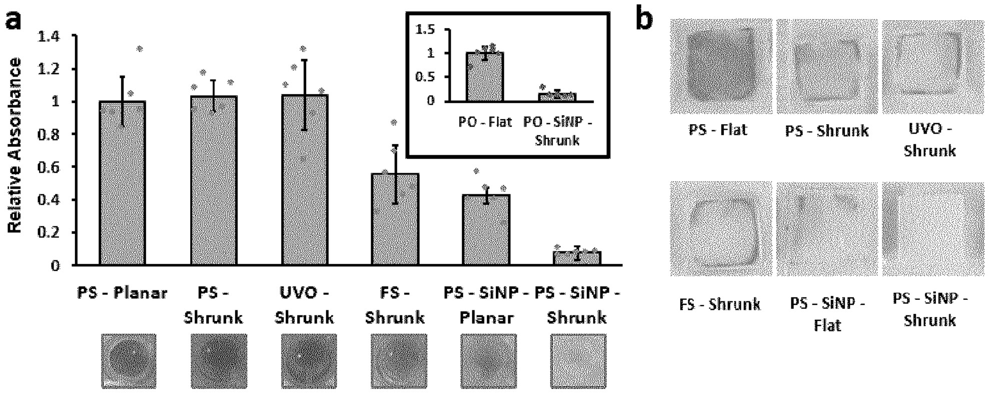

FIG. 5 shows a study of blood adherence to the omniphobic hierarchical surfaces by a) determining the absorbance of the transferred blood from surfaces to solution phase, normalized to the value obtained from PS-Planar (graph inset shows the blood adherence assay of PO-SiNP- Shrunk on polyolefin pristine flat polyolefin) and b) qualitative blood stain assessment (after 30 minute incubation in whole blood and 2× washes) in exemplary embodiments of the application.

Figure 6:
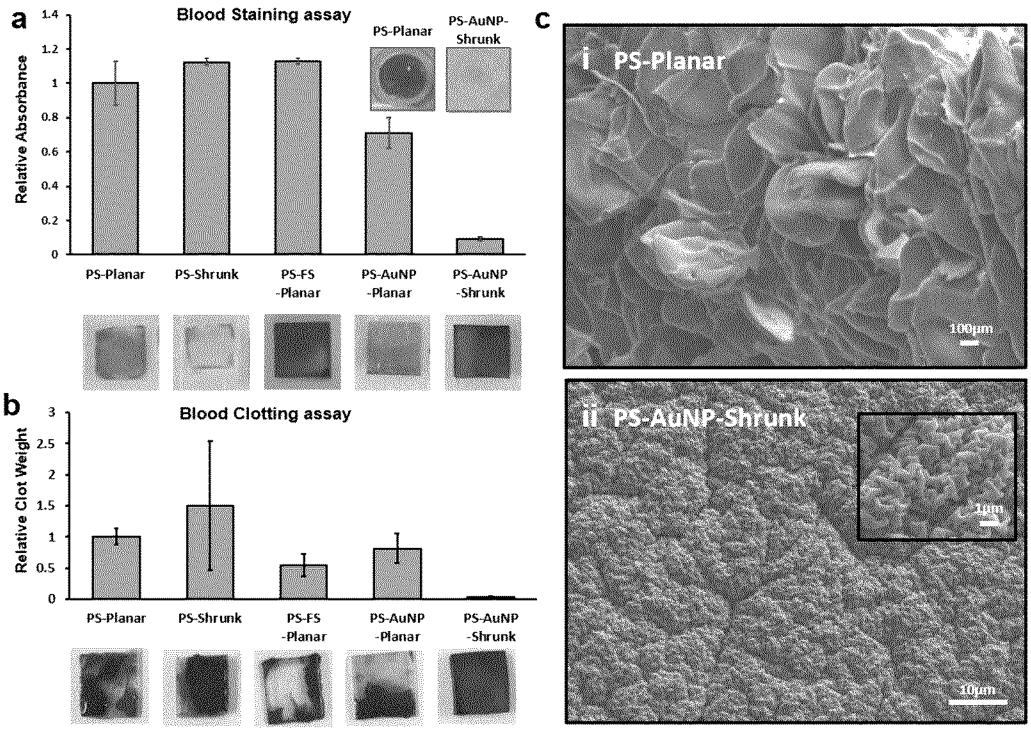

FIG. 6 shows a study of blood repellency on blood adherence to the exemplary PS-AuNP-Shrunk omniphobic hierarchical surfaces. a) The absorbance of a solution containing blood detached from surfaces incubated with blood. The absorbances are normalized to the value obtained from PS-Planar. Representative images of PS-Planar and PS-AuNP-Shrunk well are shown at the top right of the figure. Representative images of samples which were incubated 30 minutes in whole blood after 2× washes, showing no blood stain for the PS-SiNP-Shrunk sample, whereas the other control groups are showing significant amount of blood stain on their surface. b) Relative clot weight is graphed normalized to the adhered clot to PS-Planar. Representative images of samples are shown after being exposed to the clotting assay. Error bars represent standard deviation from the mean for at least three samples. c) SEM images of the clotting assay performed on the PS-Planar (i) and PS-AuNP-Shrunk (ii), demonstrating blood adherence to the planar surface. The scale bars in (i) is 100 μm and in (ii) on the larger SEM images are 10 μm and the insets are 1 μm.

Figure 7:
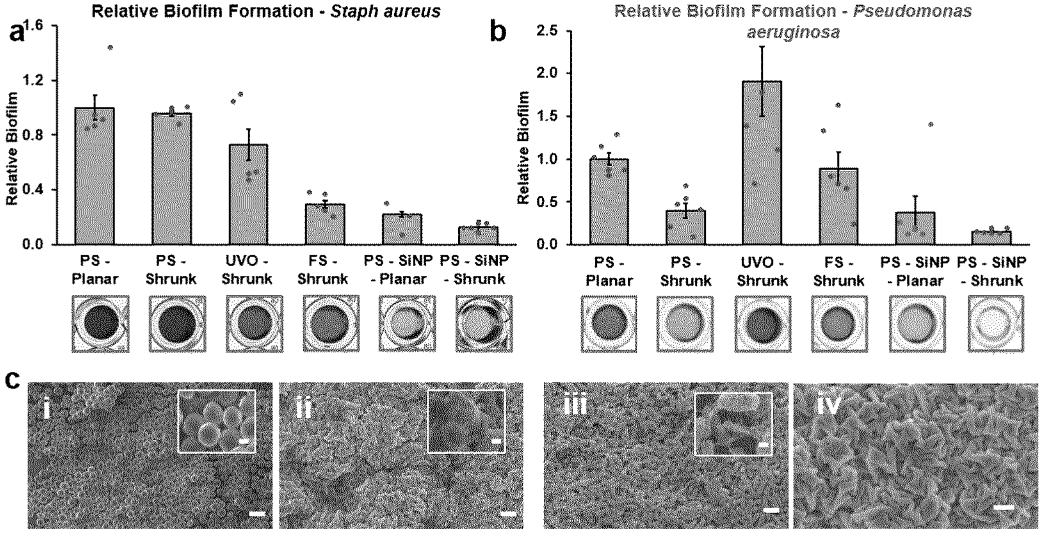

FIG. 7 shows biofilm formation and bacterial adherence verified by a crystal violet biofilm assay on various surfaces for a) *S. aureus* and b) *P. aeruginosa* (data is normalized to PS-Planar) with c) corresponding SEM images in exemplary embodiments of the application; the scale bars on larger SEM images are 1 μm and for the insets are 200 nm.

Figure 8:
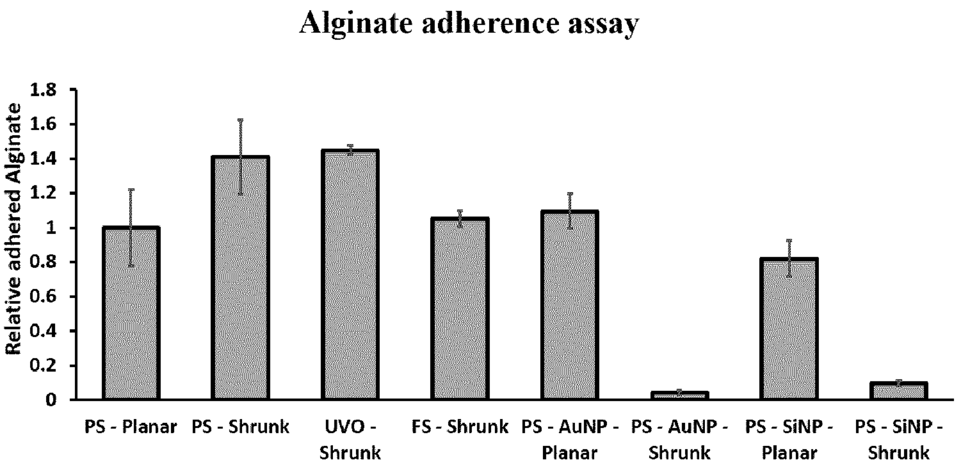

FIG. 8 shows the relative alginate adherence, as a simulation of fouling, on various surfaces in exemplary embodiments of the application.

Figure 9:
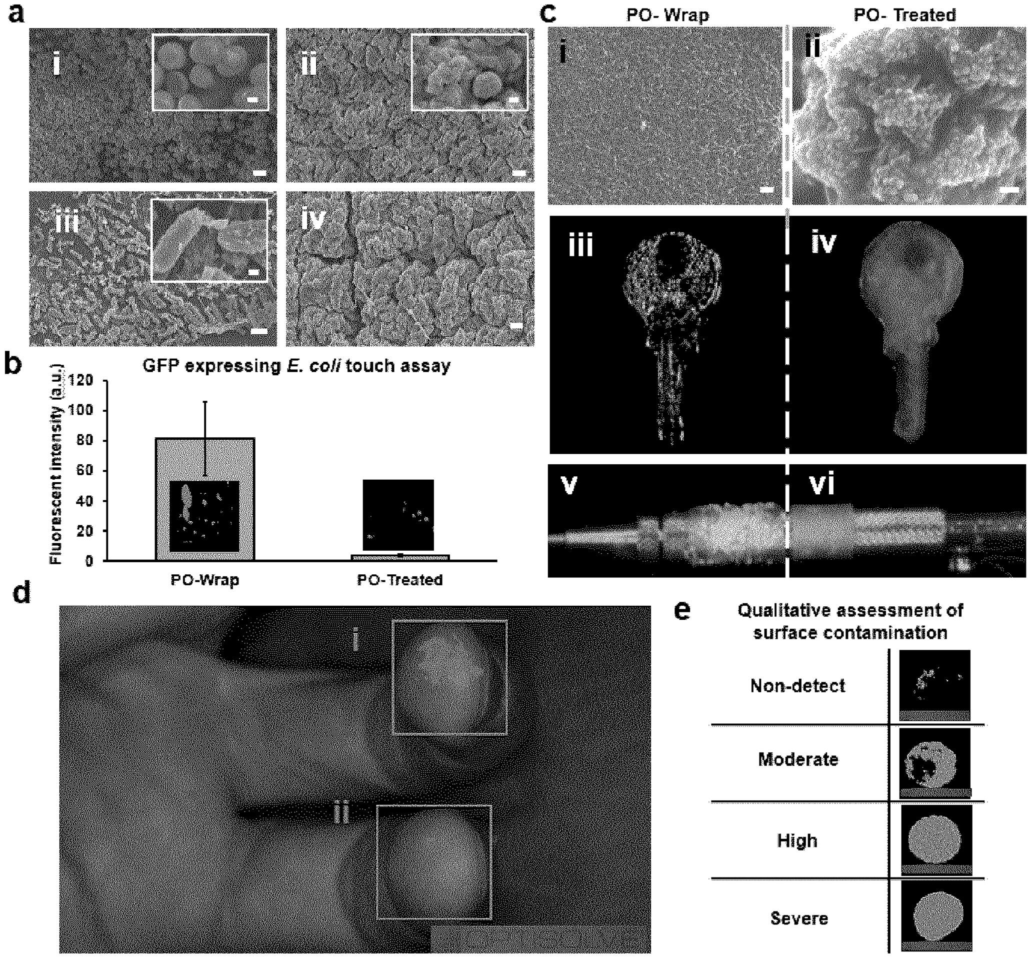

FIG. 9 shows a) SEM images of exemplary biofilm assays using *S. aureus* and *P. aeruginosa* on planar and hierarchical wraps, b) quantitative bacterial adherence assay (using a GFP expressing *E. coli* touch assay on planar and hierarchical polyolefin wraps), c) qualitative and quantitative bacterial adherence assay on various objects (such as a key and a pen), and d) transfer of bacteria from treated versus untreated surfaces with a touch assay with e) a legend for surface contamination in exemplary embodiments of the application; scale bars on bigger SEM images are 1 μm and for the insets are 200 nm.

Figure 10:
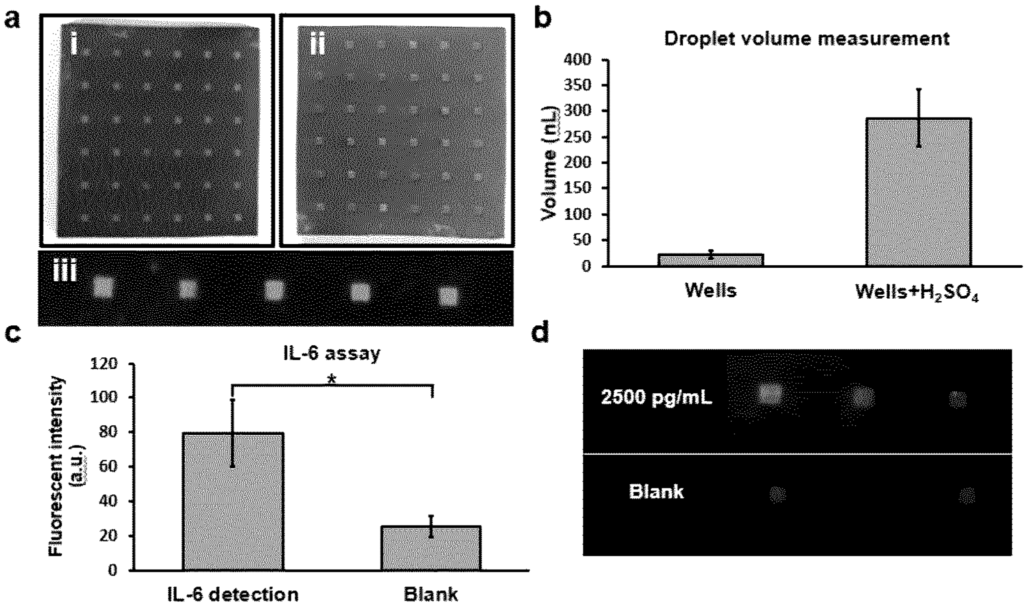

FIG. 10 shows exemplary hierarchically structured surfaces in which hydrophilic patterns were introduced using a masking method to create hydrophilic wells: a) (i) shows patterned wells with planar (inside the squares) and modified regions, (ii) shows the patterned well after being dipped in blue dyed water, demonstrating digitization of the water droplets, (iii) digitizing Cy5 tagged anti IL-6 antibody on the patterned wells; b) Volume measurement on wells and wells treated with $H_2SO_4$; c) IL-6 assay performed on the hydrophilic wells by dipping the wells in solutions containing the assay contents; d) Representative fluorescent images of the wells after the assay with 2500 pg/mL and no IL-6 (blank).

DETAILED DESCRIPTION

I. Definitions

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

In embodiments comprising an "additional" or "second" component, the second component as used herein is chemically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

The term "room temperature" as used herein means a temperature in the range of about 20° C. and 25° C.

The term "wrinkling" as used herein refers to any process for forming wrinkles in a material.

The term "hierarchical" as used herein refers to a material having both microscale and nanoscale structural features on the surface of the material.

The term "omniphobic" as used herein in respect to a material refers to a material that exhibits both hydrophobic (low wettability for water and other polar liquids) and oleophobic (low wettability for low surface tension and nonpolar liquids) properties. Such omniphobic materials with very high contact angles are often regarded as "self-cleaning" materials, as contaminants will typically bead up and roll off the surface.

The term "shrinkable polymer" or "heat-shrinkable polymer" as used herein refers to a pre-strained polymeric material, such as but not limited to polystyrene or polyolefin, which is shrunk through subjecting the material to a temperature above its glass transition temperature.

The term "reactive functional group" as used herein refers to a group of atoms or a single atom that will react with another group of atoms or a single atom (so called "complementary functional group") to form a chemical bond between the two groups or atoms.

The term "reacts with" as used herein generally means that there is a flow of electrons or a transfer of electrostatic charge resulting in the formation of a chemical bond.

The term "suitable" as used herein means that the selection of the particular compound or conditions would depend on the specific synthetic manipulation to be performed, and the identity of the molecule(s) to be transformed, but the selection would be well within the skill of a person trained in the art. All process/method steps described herein are to be conducted under conditions sufficient to provide the product shown. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

The term "alkyl" as used herein, whether it is used alone or as part of another group, means straight or branched chain, saturated alkyl group, that is a saturated carbon chain that contains substituents on one of its ends. The number of carbon atoms that are possible in the referenced alkyl group are indicated by the numerical prefix "$C_{n1-n2}$". For example, the term $C_{1-4}$ alkyl means an alkyl group having 1, 2, 3 or 4 carbon atoms.

The term "alkane" as used herein means straight or branched chain, saturated alkane, that is a saturated carbon chain.

The term "alkylene" as used herein, whether it is used alone or as part of another group, means straight or branched chain, saturated alkylene group, that is a saturated carbon chain that contains substituents on two of its ends. The number of carbon atoms that are possible in the referenced alkylene group are indicated by the numerical prefix "$C_{n1-n2}$". For example, the term $C_{1-6}$ alkylene means an alkylene group having 1, 2, 3, 4, 5 or 6 carbon atoms.

The term "halo" as used herein refers to a halogen atom and includes F, Cl, Br and I.

The term "amino" as used herein refers to the functional group $NH_2$ or $NHR^a$, wherein Ra is $C_{1-6}$alkyl.

The term "hydroxyl" as used herein refers to the functional group OH.

II. Materials of the Application

Through a comprehensive study of both chemical and physical surface modification to develop surfaces having micro, nano, or hierarchical structuring, it was found that fluorosilanized hierarchical structuring provides superior hydrophobicity and oleophobicity with water contact angle of above 150°, hexadecane contact angle of above 110°, and sliding angles as low as below 5°. Such omniphobic properties were not observed with microstructured or nanostructured surfaces. Without wishing to be limited by theory, the omniphobicity originates from the stable Cassie state and more air pockets trapped beneath the liquids contacting the hierarchical surface for both low and high surface tension liquids.

Accordingly, in one aspect of the application, there is included a material comprising a substrate, at least one nanoparticle layer on at least a portion of the substrate and at least one omniphobic molecular layer on the nanoparticle layer.

In one aspect of the application, provided is a material having a surface with hierarchical structures comprising a shrinkable polymer substrate with microscale wrinkling, a plurality of nanoparticles deposited on the substrate and at least one fluorosilane monolayer deposited on the substrate having a plurality of nanoparticles wherein the surface exhibits omniphobic properties.

In some embodiments, the hierarchical structures comprise microstructures and nanostructures. In some embodiments, the microstructures are fabricated from wrinkling the surface of the shrinkable polymer substrate and nanostructures are provided from the plurality of nanoparticles deposited on the substrate.

Also included in the present application is a material comprising a substrate, at least one nanoparticle layer on at least a portion of the substrate and at least one omniphobic molecular layer on the nanoparticle layer, wherein the material comprises microstructured and nanostructured wrinkles and the portion of the substrate comprising the at least one nanoparticle layer and at least one omniphobic molecular layer form hierarchical structures that are omniphobic.

In some embodiments, the omniphobic molecular layer comprises, consists essentially of or consists of a fluorosilane, a fluorocarbon, a fluoropolymer, or an organosilane, or mixtures thereof. In some embodiments, the omniphobic molecular is a fluorosilane layer or monolayer.

In some embodiments, the fluorosilane layer or monolayer is formed using one or more compounds of the Formula I:

(I)

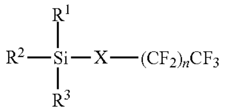

wherein

X is a single bond or is $C_{1-6}$ alkylene;

n is an integer of from 0 to 12; and $R^1$, $R^2$ and $R^3$ are each independently a hydrolysable group.

The hydrolysable group is any suitable hydrolysable group, the selection of which can be made by a person skilled in the art. In some embodiments, $R^1$, $R^2$ and $R^3$ are independently halo or —O—$C_{1-4}$ alkyl. In some embodiments, $R^1$, $R^2$ and $R^3$ are all independently halo. In some embodiments, $R^1$, $R^2$ and $R^3$ are all independently —O—$C_{1-4}$alkyl. In some embodiments, R', $R^2$ and $R^3$ are all OEt. In some embodiments, $R^1$, $R^2$ and $R^3$ are all Cl.

In some embodiments, X is $C_{1-6}$ alkylene. In some embodiments, X is $C_{1-4}$alkylene. In some embodiments, X is —$CH_2CH_2$—.

In some embodiments, n is an integer of from 3 to 12. In some embodiments, n is an integer of from 3 to 8. In some embodiments, n is an integer of from 4 to 6. In some embodiments, n is 5.

In some embodiments, $R^2$ and $R^3$ are all Cl, X is —$CH_2CH_2$— and n is 5. In some embodiments, $R^1$, $R^2$ and $R^3$ are all OEt, X is —$CH_2CH_2$— and n is 5.

In some embodiments, the fluorosilane layer or monolayer is formed using any fluorocarbon-containing silanes such as, but not limited to, trichloro (1H,1H,2H,2H-perfluorooctyl)silane (TPFS), 1H,1H,2H,2H-perfluorooctyltriethoxysilane, 1H,1H,2H,2H-perfluorodecyltriethoxysilane, 1H,1H,2H,2H-perfluorododecyltrichlorosilane, 1H,1H,2H,2H-perfluorodecyltrimethoxysilane, trimethoxy(3,3,3-trifluoropropyl)silane, (pentafluorophenyl)triethoxysilane and heptadecafluoro-1,1,2,2-tetra-hydrodecyl trichlorosilane, and mixtures thereof.

In some embodiments, the fluorosilane deposited on the substrate includes, but is not limited to, trichloro(1H,1H, 2H,2H-perfluorooctyl)silane, 1H,1H,2H,2H-perfluorooctyltriethoxysilane or a fluorosilane of similar composition. In some embodiments, the fluorosilane is commercially available. In some embodiments, the omniphobic molecule, such as the fluorosilane, lowers the surface energy of the material, increasing the omniphobic properties.

In some embodiments, the substrate is selected from a polymer, an elastomer, or an elastomeric composite. In some embodiments, the substrate is a polymer. In some embodiments, the polymer is a shrinkable polymer.

In some embodiments, the shrinkable polymer comprises a material selected from, but not limited to, polystyrene, polyolefin, polyethylene, polypropylene, and other shrinkable polymers or combinations and copolymers thereof. In some embodiments, the substrate is pre-strained polystyrene. In some embodiments, the substrate is polyolefin. In some embodiments, the substrate is a thin flexible film of polyolefin.

In some embodiments, the substrate is treated to activate the substrate, for example for reaction with or attraction to the nanoparticles. In some embodiments, the substrate is treated to introduce hydroxyl groups, in, on or over the substrate. In some embodiments, the treatment is with ultraviolet ozone or plasma, such as, but not limited to, air, oxygen, carbon dioxide or argon plasma.

In some embodiments, the nanoparticles comprise dielectric, semiconductive, metallic, wax or polymeric materials. In some embodiments, the nanoparticles comprise a material selected from, but not limited to, the group consisting colloidal silica, gold, titanium dioxide, silver, chitosan, cellulose, alginate or polystyrene. In some embodiments, the nanoparticles comprise colloidal silica or gold.

In some embodiments, the material further comprises an adhesion-promoting layer between the substrate and the at least one nanoparticle layer and/or between the at least one nanoparticle layer and the at least one omniphobic molecular layer. In an embodiment, the adhesion promoting compound is selected to react with, or otherwise attract (e.g. by electrostatic, ionic or other attractive forces) the compounds making up an adjacent layer. For example, the adhesion-promoting compounds may comprise functional groups that will react with, or otherwise attract, hydroxyl groups on the shrinkable polymer substrate, hydroxyl groups on the nanoparticles, functional groups on materials associated with the nanoparticles and/or the hydrolysable groups on the omniphobic molecular layer. In some embodiments, the interaction of the adhesion-promoting layer and the substrate and the at least one nanoparticle layer and/or between the at least one nanoparticle layer and the at least one omniphobic molecular layer, may be controlled or affected by processing conditions, such as but not limited to pH, temperature and concentrations, as would be known to those skilled in the art and those conditions adjusted or optimized accordingly.

In some embodiments, the adhesion-promoting layer is formed using one or more silanes comprising different reactive functionalities. In some embodiments, the silanes comprising different reactive functionalities are selected from, but are not limited to aminosilanes, glycidoxysilanes, alkanesilanes, epoxy silanes and the like. In some embodiments, the adhesion-promoting layer is formed using one or more compounds of the Formula II:

(II)

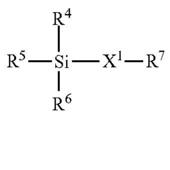

wherein one or more of $R^4$, $R^5$ and $R^6$ is OH or a group that is converted by hydrolysis to OH, and the remaining of $R^4$, $R^5$ and $R^6$ is selected from $C_{1-6}$alkyl;

$X^1$ is linker; and $R^7$ is a reactive functional group.

The group that is converted by hydrolysis to OH is any suitable hydrolysable group, the selection of which can be made by a person skilled in the art. In some embodiments, the hydrolysable group is halo or —O—$C_{1-4}$ alkyl.

In some embodiments, $X^1$ is $C_1$-$C_{20}$alkylene, $C_2$-$C_{20}$alkenylene or $C_2$-$C_{20}$alkynylene, each of which is optionally interrupted by O or C(O). In some embodiments, $X^1$ is $C_{1-20}$alkylene. In some embodiments, X is $C_{1-10}$alkylene.

In some embodiments, $R^7$ is selected to react with, or otherwise attract (e.g. by electrostatic or ionic or other attractive forces) the compounds comprised in an adjacent layer, such as, but not limited to, hydroxyl groups on the shrinkable polymer substrate, hydroxyl groups on the nanoparticles, functional groups on materials associated with the nanoparticles and/or the hydrolysable groups on the fluorosilane.

In some embodiments, $R^7$ is an amino group, an epoxide, a glycidoxy group

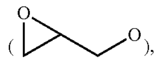

a carboxylic acid ($CO_2H$), an aldehyde (COH), an ester ($CO_2R^b$, wherein $R^b$ is $C_{1-6}$alkyl, benzyl, etc.), a tosyl group, halo, isocyanato (NCO), and the like. In some embodiments, $R^7$ is $NH_2$, $CO_2H$ or glycidoxy.

In some embodiments, the adhesion-promoting layer is formed using one or more of 3-(trimethoxysilyl) propyl aldehyde, 3-(triethoxysilyl) propyl isocyanate, 3-glycidoxypropyltrimethoxysilane, (3-glycidyloxypropyl)trimethoxysilane and aminopropyltrimethoxy silane (APTES). In some embodiments, the adhesion-promoting layer is formed using aminopropyltrimethoxy silane (APTES)

In some embodiments, the material further comprising a silane linker layer between the substrate and the plurality of nanoparticles. In some embodiments, the silane linker layer comprises (3-aminopropyl)triethoxysilane (APTES).

In some embodiments, materials having a surface with hierarchical structures show both hydrophobicity and oleophobicity. In some embodiments, the surface exhibits water contact angles above 150°, hexadecane contact angles above 110° and water sliding angles below 5°. Such omniphobic properties were not observed using unmodified polymer substrates or polymer surfaces that were only either microstructured or nanostructured.

In some embodiments, the materials of the application have a water static contact angle of about 145° to about 160°, or about 150° to about 155°, as measured at room temperature using a goniometer (e.g. OCA 20, from Future Digital Scientific) and water droplets dispensed using an automated syringe.

In some embodiments, the materials of the application have a whole blood static contact angle of about 130° to about 160°, or about 135° to about 145°, as measured at room temperature using a goniometer (e.g. OCA 20, from Future Digital Scientific) and whole blood droplets dispensed using a pipette.

In some embodiments, the materials of the application have a hexadecane static contact angle of about 110° to about 140°, or about 120° to about 135°, as measured at room temperature using a goniometer (e.g. OCA 20, from Future Digital Scientific) and hexadecane droplets dispensed using pipette.

In some embodiments, the materials of the application have a water sliding angles of about 1° to about 10°, or about 5°, as determined using a digital angle level at room temperature (e.g. ROK). In some embodiments, the material further comprises a lubricating layer. In some embodiments, the lubricating layer comprises hydrocarbon liquid, fluorinated organic liquid, or perfluorinated organic liquid.

In some embodiments, the materials of the application can be made of any thickness depending on the desired application as would be known to those skilled in the art. In some embodiments, the materials of the application have a thickness of about 0.001 mm to about 100 mm, or about 0.01 mm to about 50 mm.

In some embodiments, when interfacing these hierarchical surfaces with blood or bacterial contaminants, it was observed that their omniphobicity can be translated to better anti-biofouling properties.

In some embodiments, the surface exhibits repellency to liquids comprising biospecies. Non-limiting examples of biospecies include microorganisms such as bacteria, fungi, viruses or diseased cells, parasitized cells, cancer cells, foreign cells, stem cells, and infected cells. Non-limiting examples of biospecies also included biospecies components such as cell organelles, cell fragments, proteins, nucleic acids vesicles, nanoparticles, biofilm, and biofilm components.

In some embodiments, the surface exhibits repellency to bacteria and biofilm formation. In some embodiments, the bacteria are selected from one or more of gram-negative bacteria or gram-positive bacteria In some embodiments, the bacteria are selected from one or more of *Escherichia coli, Streptococcus species, Helicobacter pylori, Clostridium* species and meningococcus. In some embodiments, the bacteria are gram-negative bacteria selected from one or more of *Escherichia coli, Salmonella typhimurium, Helicobacter pylori, Pseudomonas aerugenosa, Neisseria meningitidis, Klebsiella aerogenes, Shigella sonnei, Brevundimonas diminuta, Hafnia alvei, Yersinia ruckeri, Actinobacillus actinomycetemcomitans, Achromobacter xylosoxidans, Moraxella osloensis, Acinetobacter lwoffi*, and *Serratia fonticola*. In some embodiments, the bacteria are gram-positive bacteria selected from one or more of *Listeria monocytogenes, Bacillus subtilis, Clostridium difficile, Staphylococcus aureus, Enterococcus faecalis, Streptococcus pyogenes, Mycoplasma capricolum, Streptomyces violaceoruber, Corynebacterium diphtheria* and *Nocardia farcinica*. In some embodiments, the bacteria are *Pseudomonas aeruginosa* or *Staphylococcus aureus*. In some embodiments, biofilm attachment is decreased by about 85%.

In some embodiments, the surface exhibits repellency to viruses. In some embodiments, the viruses are enveloped viruses, non-enveloped viruses, DNA viruses, single-stranded RNA viruses and/or double-stranded RNA viruses. In some embodiments the viruses are selected from one or more of rhinovirus, myxovirus (including influenza virus), paramyxovirus, coronavirus, norovirus, rotavirus, herpes simplex virus, pox virus (including variola virus), reovirus, adenovirus, enterovirus, encephalomyocarditis virus, cytomegalovirus, varicella zoster virus, rabies lyssavirus and retrovirus (including HIV). In some embodiments, the viruses are selected from one or more of rhinovirus, influenza, norovirus, rotavirus, herpes, HIV, and coronavirus, smallpox.

In some embodiments, the surface exhibits repellency to biological fluids. Non-limiting examples of biological fluids include water, whole blood, plasma, serum, sputum, sweat, pus, feces, urine, saliva, tears, vomit and combinations thereof. In some embodiments, the surface exhibits whole human blood contact angles above 140°. In some embodiments, the surface exhibits repellency to whole blood. In some embodiments, the surface attenuates blood coagulation. In some embodiments, blood adhesion is decreased by about 93%.

In some embodiments, the materials of the application exhibit repellency towards particulate matter, such as dust.

Furthermore, when flexible material of the application is bent, the surfaces show a blood contact angle that is comparable to the unbent samples, demonstrating retention of their omniphobic properties under different form factors. These findings display remarkable omniphobic performance for a flexible surface, which holds the benefit of being easily placed on a wide range of materials. In some embodiments, the material is used as a flexible plastic wrapping. In some embodiments, the material comprises a flexible polyolefin wraps commonly used as packaging material.

In some embodiments, the material of the application including the flexible omniphobic wrapping films could be placed on any item comprising a plastic surface such as plastic material that is disposed of for fouling or contamination, including, but not limited to plastic shopping bags, shower curtains and children's toys (such as blow up pools and slip and slides water toys).

In some embodiments, the material of the application including the flexible omniphobic wrapping films could be placed on any surface requiring hydrophobic properties, including biospecies-repellant properties, including, but not limited to keyboards, mouse, public kiosks, ATMs, sunglasses, car windshields, camera lenses, solar panels, and architectural systems (knobs/latches, hospital bed rails, windows, handles), public trash handles, transportation (e.g. poles, seats, handles, buttons, airplane trays), food service items (cutting boards, countertops, food storage containers, handles, doors, refrigerator interior, upstream, downstream, consumer-targeted), restroom items (toilet seat, flush handle), and manufacturing equipment (e.g., surfaces, conduits, tanks).

In some embodiments, the materials of the application and the flexible omniphobic wrapping films could be placed on any healthcare and laboratory surfaces, personal protection equipment and medical devices.

In some embodiments, the materials of the application and the flexible omniphobic wrapping films could be placed on a wide range of surfaces: high risk surfaces in hospital settings (e.g. surgical and medical equipment), food packaging (e.g. packaging of meat, produce, etc.), high contact surfaces in public locations (e.g. door knobs, elevator buttons, etc.) or wearable articles (e.g. gloves, watches, etc.). In some embodiments, the omniphobic plastic wrapping is used to repel liquids with various surface tensions, reduce blood adhesion, and decrease bacterial contamination. In some embodiments, materials of the application are effective in reducing the spread of bacteria by serving as an intermediate transfer surface. Through a "touch assay", it is demonstrated that significantly less amount of bacteria (15-20 times less) are transferred from a contaminated touch to the hierarchical wraps compared to untreated surfaces. In addition to significantly reducing bacterial attachment, these surfaces demonstrate a remarkable ability in reducing bacterial transfer to another surface such as the human skin.

Accordingly, the present application further includes a device or article comprising the material of the application. In some embodiments, the material is on the surface of the device or article. Therefore the present application includes a device or article comprising a surface wherein at least a portion of the surface comprises a material comprising a substrate, at least one nanoparticle layer on at least a portion of the substrate and at least one omniphobic molecular layer on the nanoparticle layer, wherein the material comprises microstructured and nanostructured wrinkles, and the portion of the substrate comprising the at least one nanoparticle layer and at least one omniphobic molecular layer form hierarchical structures that are omniphobic.

In some embodiments, the material is wrapped on to at least a portion of the article or device. In some embodiments, the microstructured and nanostructured wrinkles are formed by heat-shrinking the material and the material is wrapped on to at least a portion of the article or device prior to heat-shrinking and heat-shrinking is perform after wrapping to form a seal between the article or device and the material.

In some embodiments, the article or device is selected from, but not limited to, wearable articles including, but not limited to, protective clothing such as gloves, scrubs, and face masks; consumable research equipment including, but not limited to, centrifuge tubes, micropipette tips and multiwell plates. In some embodiments, the device is selected from a cannula, a connector, a catheter, a catheter, a clamp, a skin hook, a cuff, a retractor, a shunt, a needle, a capillary tube, an endotracheal tube, a ventilator, a ventilator tubing, a drug delivery vehicle, a syringe, a microscope slide, a plate, a film, a laboratory work surface, a well, a well plate, a Petri dish, a tile, a jar, a flask, a beaker, a vial, a test tube, a tubing connector, a column, a container, a cuvette, a bottle, a drum, a vat, a tank, a dental tool, a dental implant, a biosensor, a bioelectrode, an endoscope, a mesh, a wound dressing.

In some embodiments, the present application also includes a material comprising a substrate, at least one nanoparticle layer on at least a portion of the substrate and at least one omniphobic molecular layer on the nanoparticle layer. In some embodiments, this material is applied to a device or article and is wrinkled. In some embodiments, the wrinkling is by heat shrinking and the heat shrinking molds or seals the material to the article or device. In some embodiments, the wrinkling causes the formation of microstructures and nanostructures in the material. In some embodiments, the molding of the material to the article or device is irreversible so the material remains on the article or device, even under washing conditions.

In some embodiments, the material comprises a plurality of portions with hierarchical structures and a plurality of portions without hierarchical structures, wherein the plurality of portions without hierarchical structures are arranged in a pattern. In some embodiments, the pattern comprises substantially evenly spaced rows of portions without hierarchical structures. In some embodiments, the portions without hierarchical structures are hydrophilic. In some embodiments, the hydrophilic portions form wells in the portions with hierarchical structures, such wells being suitable for performing aqueous-based assays and assays on biological materials. In some embodiments, the biological materials are selected from blood, plasma, urine and saliva.

III. Methods of the Application

The present application also includes a method of fabricating a material having a surface with hierarchical structures comprising:

a) activating a substrate by oxidation of a surface layer, b) depositing a plurality of nanoparticles on the activated surface to form at least one nanoparticle layer on at least a portion of the substrate, c) coating the surface with an omniphobic molecule to create at least one omniphobic molecular layer, and d) treating the material to form wrinkles, wherein the resultant surface exhibits omniphobic properties.

In another aspect of the application, provided is a method for fabricating a material having a surface with hierarchical structures comprising activating a substrate by oxidation of a surface layer, depositing a plurality of nanoparticles on the activated surface to form at least one nanoparticle layer on at least a portion of the substrate, coating the surface with an omniphobic molecule to create at least one omniphobic molecular layer or monolayer and heat-shrinking the material to wrinkle the surface wherein the resultant surface exhibits omniphobic properties.

In some embodiments, prior to activating the substrate is treated to clean at least the portion of the substrate that is to be activate. In some embodiments, the cleaning is by any known means, such as by any known cleaning substance or treatment. In some embodiments, the cleaning is by alcohol treatment or washing.

In some embodiments, the method further comprises, after activating the substrate, depositing an adhesion-promoting layer between the substrate and the at least one nanoparticle layer and/or between the at least one nanoparticle layer and the at least one omniphobic molecular layer.

In some embodiments, the method further comprises modifying the surface with a silane linker layer to bind nanoparticles after activating the polymer surface.

In some embodiments, the method further comprises depositing a lubricating layer on the surface after heat-shrinking the material. In some embodiments, depositing a lubricating layer reduces friction on the surface of the material.

In some embodiments, the substrate is treated to activate the substrate, for example for reaction with or attraction to the nanoparticles. In some embodiments, the substrate is treated to introduce hydroxyl groups, in, on or over the substrate. In some embodiments, the treatment is with ultraviolet ozone or plasma, such as, but not limited to, air, oxygen, carbon dioxide or argon plasma. In some embodiments, the treatment is for a time for the activation of the surface to proceed to a sufficient extent (e.g. a time of about 30 seconds to about 10 minutes).

In some embodiments, activating the substrate comprises treatment with Ultraviolet-Ozone or plasma. In some embodiments, plasma treatment includes, but is not limited to, the use air, oxygen, carbon dioxide or argon plasma.

In some embodiments of the present application, all of the layers on the substrate are deposited using solution-based techniques, for example by submersion in an appropriate solution for a suitable period time. In some embodiments, the substrate is submerged for about 30 minutes to about 5 hours, or about 1 hour to about 4 hours or about 3 hours, at about room temperature and with agitation. In some embodiments, after the deposition of each layer, the substrates are washed (for example by sonication in water) and dried.

While it is advantageous for all of the layers on the substrate to be deposited using solution based techniques, a person skilled in the art will appreciate that one of more of the layers on the substrate may be deposited using alternative deposition techniques known in the art, such as, but not limited to spin coating, vapor deposition, photolithography, emulsion templating, electrospinning, reactive ion etching and/or electrochemical etching/anodizing.

In some embodiments, the method may be used to modify the surface of pre-formed article or device. In some embodiments, the material of the application is used to modify the surface of any of the articles and/or device listed above. In some embodiments, the method of fabricating a material having a surface with hierarchical structures further comprises, after c), applying the material onto a surface of an article or device, followed by treating the material on the surface of the article or device to form wrinkles.

In some embodiments, prior to applying the material onto a surface of an article of device, the surface of the article or device is treated to clean the surface. In some embodiments, the cleaning is by any known means, such as by any known cleaning substance or treatment. In some embodiments, the cleaning is by alcohol treatment or washing.

In some embodiments, the wrinkles are formed using any known wrinkling process. In some embodiments, the wrinkling process is any process that creates microstructures in the material. In some embodiments, the wrinkling process comprises exposing a compliant substrate modified with a stiff skin to compressive in-plane strain or when the substrate is subjected to the removal of tensile strain. The mismatch in the elastic moduli of the stiff layer and the compliant substrate results in the formation of wrinkles. In some embodiments, the wrinkling process comprises heating the material. In some embodiments, the heating is performed at a temperature of about 100° C. to about 200° C., about 120° C. to about 160° C. or about 135° C. to about 145° C., for about 1 minute to about 10 minutes, or about 3 minutes to about 7 minutes.

In some embodiments, wrinkles are formed by applying the material to a mold that is itself wrinkled (e.g. has microscopic wrinkles) under conditions for the wrinkling to be induced or transferred to the material via the mold.

In some embodiments, wrinkles are formed by laser machining, lithography or other micro/nano fabrication techniques.

In some embodiments, wrinkles are formed mold by a combination of the above techniques.

In some embodiments, wrinkles are formed by heat-shrinking the material which comprises placing the material into a pre-heated oven for a length of time needed to wrinkle the surface. In some embodiments, the heat-shrinking is performed at a temperature of about 100° C. to about 200° C., about 120° C. to about 160° C. or about 135° C. to about 145° C., for about 1 minute to about 10 minutes, or about 3 minutes to about 7 minutes.

In some embodiments, the present application includes a method of applying a material to a device or article, comprising wrapping the article or device with the material and wrinkling the material, wherein the material comprises a substrate, at least one nanoparticle layer on at least a portion of the substrate and at least one omniphobic molecular layer on the nanoparticle layer.

In some embodiments, the wrinkling is by heat shrinking and the heat shrinking molds or seals the material to the article or device. In some embodiments, the wrinkling causes the formation of microstructures and nanostructures in the material.

In some embodiments, the method is used to create an omniphobic surface with hierarchical structures on wearable articles including, but not limited to, protective clothing such as gloves, scrubs, and face masks. In some embodiment, the method is used to create an omniphobic surface on consumable research equipment including, but not limited to, centrifuge tubes, micropipette tips and microwell plates.

In some embodiments, the method further comprises wrapping the material as a flexible plastic film around an object before heat-shrinking the material. In some embodiments, heat-shrinking the material comprises heating with a heat gun for a length of time needed to wrinkle the surface. In some embodiments, the method is applied to flexible polyolefin wraps commonly used as packaging material.

In some embodiments, the method comprises all-solution processing that is amenable to large area applications and large volume manufacturing, opening the door for its application to a wide range of surfaces that have a risk of being in contact with liquid-borne contaminants.

The present application also includes a method of preventing, reducing, or delaying adhesion, adsorption, surface-mediated clot formation, or coagulation of a biological material onto a device in contact therewith, comprising:

providing the device comprising a low adhesion surface having a substrate, at least one nanoparticle layer on the substrate and at least one omniphobic molecular layer on the nanoparticle layer, wherein the surface comprises microstructured and nanostructured wrinkles, and the substrate comprising the at least one nanoparticle layer and at least one omniphobic molecular layer form hierarchical structures that are omniphobic;

and contacting the biological material to the low-adhesion surface.

The present application also includes a device for preventing, reducing, or delaying adhesion, adsorption, surface-mediated clot formation, or coagulation of a biological material in contact therewith, comprising a low adhesion surface having a substrate, at least one nanoparticle layer on the substrate and at least one omniphobic molecular layer on the nanoparticle layer, wherein the surface comprises microstructured and nanostructured wrinkles, and the substrate comprising the at least one nanoparticle layer and at least one omniphobic molecular layer form hierarchical structures that are omniphobic wherein the biological material is repelled from the surface.

In some embodiments, the device is selected from any healthcare and laboratory device, personal protection equipment and medical device. In some embodiments the device is selected from a cannula, a connector, a catheter, a catheter, a clamp, a skin hook, a cuff, a retractor, a shunt, a needle, a capillary tube, an endotracheal tube, a ventilator, a ventilator tubing, a drug delivery vehicle, a syringe, a microscope slide, a plate, a film, a laboratory work surface, a well, a well plate, a Petri dish, a tile, a jar, a flask, a beaker, a vial, a test tube, a tubing connector, a column, a container, a cuvette, a bottle, a drum, a vat, a tank, a dental tool, a dental implant, a biosensor, a bioelectrode, an endoscope, a mesh, a wound dressing, and a combination thereof.

In some embodiments, the biological material is selected from the group consisting of whole blood, plasma, serum, sweat, feces, urine, saliva, tears, vaginal fluid, prostatic fluid, gingival fluid, amniotic fluid, intraocular fluid, cerebrospinal fluid, seminal fluid, sputum, ascites fluid, pus, nasopharyngeal fluid, wound exudate fluid, aqueous humour, vitreous humour, bile, cerumen, endolymph, perilymph, gastric juice, mucus, peritoneal fluid, pleural fluid, sebum, vomit, and combinations thereof.

In some embodiments, the material comprises a plurality of portions with hierarchical structures and the plurality of portions are arranged in a pattern.

In some embodiments, the material comprising a plurality of portions with hierarchical structures and a plurality of portions without hierarchical structures, arranged in a pattern are prepared by placing a masking material over the portions of the substrate wherein hierarchical structures are not wanted. With the masking material in place, the substrate is treated as described above to fabricate the material having a surface with hierarchical structures and is removed prior to heat shrinking.

In some embodiments, the masking material is vinyl, such as a vinyl sheet. In some embodiments, the pattern is a desired pattern and a person skilled in the art would know how to prepare a masking material in the pattern to avoid having hierarchical structures fabricated on the substrate. In some embodiments, the pattern is a simple parallel row of spots or wells where the substrate does not have hierarchical structures. In some embodiments, the spots or wells are hydrophilic. In some embodiments, the wells are suitable for performing aqueous-based assays. In some embodiments, the method of fabrication of the application provides materials that are suitable as multiwall plates.

EXAMPLES

The following non-limiting examples are illustrative of the present application:

Example 1. Materials and Methods in Fabricating Omniphobic Surfaces

Reagents. (3-Aminopropyl)triethoxysilane (99%), 1H,1H,2H,2H-Perfluorodecyltriethoxysilane (97%), Ludox® TMA colloidal silica, and Alginic Acid sodium salt (sodium alginate), crystal violet were purchased from Sigma-Aldrich (Oakville, Onatrio). Ethanol (anhydrous) was purchased from Commercial Alcohols (Brampton, Ontario). Hydrochloric acid (36.5-38%) was purchased from Caledon (Georgetown, Ontario). Milli-Q grade water (18.2 MS2) was used to prepare all solutions. LB Broth, Granulated Agar, Casamino Acids was purchased from Fisher Scientific (Canada). 20% Glucose Solution was purchased from TekNova (Canada). Glacial Acetic acid was purchased from Bioshop (Burlington, Ontario). RFP-HUVECs were generously provided by Dr. P. Ravi Selvaganapathy's lab at McMaster University. Self-adhesive vinyl sheets (FDC 4304) were purchased from FDC graphic films (South Bend, Indiana).

Wrinkled Surfaces Fabrication. Pre-strained polystyrene (PS, Graphix Shrink Film, Graphix, Maple Heights, Ohio) and polyolefin (PO, Cryovac D-955) was cut into desired substrate sizes using a Robo Pro CE5000-40-CRP cutter (Graphtec America Inc., Irvine, California). The substrates were cleaned with ethanol, milli-Q water and dried with air. The PS was placed in pre-warmed-up (4 minutes) UVO cleaner (UVOCS model T0606B, Montgomeryville, Pennsylvania) for 4 minutes and PO was subject to air-plasma in an Expanded Plasma Cleaner (Harrick Plasma) on HIGH RF power setting for 1 minute.

To create the non-fluorinated microstructured sample, UVO-Shrunk, the UVO treated PS was subject to thermal treatment by placing the substrates into an oven (ED56, Binder, Tuttlingen, Germany) pre-heated to 140° C. for 5 minutes. To create the fluorinated microstructured sample, FS-Shrunk, the activated substrates were submerged in a prepared fluorosilane solution for approximately 3 hours with agitation at room temperature in an incubating mini shaker (VWR International, Mississauga, Ontario) to covalently bond an FS layer onto the surface through hydrolysis and condensation reactions (41). For the deposition of fluorosilane, a mixture of ethanol and milli-Q water with volume ratio of 3:1 was prepared. A catalytic amount of hydrochloric acid (0.1 wt %) was added into the solution with 0.5 wt % of fluorosilane. The solution was incubated at 40° for an hour before use. The fluorosilane deposition is similar with a protocol used to create omniphobic micro- and nano-structured fabrics (42). Following deposition of coating, the substrates were sonicated in Milli-Q water and subsequent 10 min sonication in ethanol for 10 minutes and dried.

To create the PS-AuNP-Planar, PS-AuNP-Shrunk, PS-SiNP-Planar, and PS-SiNP-Shrunk, the activated PS substrates were submerged in 10% aqueous APTES (for creating the seed layer for nanoparticle solution for respected samples) for approximately 3 hours with agitation at room temperature in an incubating mini shaker. Following deposition of coating, the substrates were sonicated in Milli-Q water for 10 minutes and dried. SiNPs solution was created by vertexing 1 part Ludox TMA colloidal silica with 2 parts milli-Q water for 10 seconds and sonication for half an hour. AuNPs were synthesized according to protocol described elsewhere (43) and were kept at 4° C. until used. For the deposition of AuNPs/SiNPs (after the APTES treatment), the substrates were fixed in petri dishes using double sided tape and submerged in the AuNPs/SiNPs solution overnight. The amine terminus on the aminosilane had electrostatic interactions with the citrate surfactant of AuNPs (44) and the negative surface charge of the SiNPs and allowed for the deposition of the nanoparticles on the surface. Following deposition, the substrates were sonicated in Milli-Q water for 10 minutes and dried. To coat the AuNPs covered substrate with fluorosilane, the substrates were first submerged in 10% aqueous APTES for approximately 3 hours with agitation. The substrates were sonicated in milli-Q water for 10 minutes and dried. Following silanization of the AuNPs surface, the substrates were placed in the prepared fluorosilane solution for approximately 3 hours with agitation (PS-AuNP-Planar). The SiNPs surface were placed in the prepared fluorosilane solution for the same duration without the APTES treatment (PS-SiNP-Planar). The substrates were then sonicated in milli-Q water for 10 minutes and dried. At this step, the Planar, nanoparticle treated samples are prepared (PS-AuNP-Planar and PS-SiNP-Planar). To add the microstructures to the nanoparticle treated surface, thermal treatment was performed by placing the substrates into an oven pre-heated to 140° C. for 5 minutes (PS-AuNP-Shrunk, and PS-SiNP-Shrunk).

The patterned surfaces were fabricated in a similar way. Before the modification steps, a vinyl mask was placed on a clean (as described above) PS sheet and cut in the desired pattern with the craft cutter. The vinyl was then removed from the regions where the treatment was required and the samples were subject to UVO treatment and the subsequent treatments while maintaining the vinyl mask on. After the final FS treatment, the vinyl mask was removed and the samples were subjected to heat treatment as described above. To enhance the hydrophilicity on the untreated regions, a 0.6 μL droplet of 12 M $H_2SO_4$ was deposited on the untreated regions, and incubated for 10 minutes and subsequently washed 2 times with Milli-Q water.

To create the PO treated wraps, the activated wrap was subject an overnight APTES treatment as described earlier followed by 10 minutes sonication in Milli-Q water. Subsequently, samples were immersed in SiNP solution (as described) for 3 hours followed by 3 hours fluorosilane treatment (as described earlier). The treated surface was then further subject to heat shrinking either by a heat gun (Amtake HG6618) or by incubation in a pre-heated oven at 140° C. for 5 minutes. To wrap the treated PO before the shrinking process, the object was wrapped and sealed with a sealer and further subject to the heat gun.

Example 2. Characterization of Omniphobic Surfaces

For all graphical representations of the data, error bars represent standard deviation from the mean for at least three samples.

Surface physical characterization. SEM imaging was performed on a JEOL 7000F. Samples were coated with 3 nm of platinum prior to imaging. Contact angle measurement was made on a goniometer (OCA 20, Future Digital Scientific, Garden City, NY) with water droplets (5 μL) dispensed by automated syringe and hexadecane (5 μL) by hand using a pipette. The sessile drop contact angle was provided via image processing software (Dataphysics SCA 20) through ellipse curve fit shape analysis of the droplets. Sliding angle measurements were made on a self-made tilting platform with angle controlled by an automated servo. Each value was averaged over at least three measurements.

Advancing and receding contact angle. Advancing and receding contact angle were evaluated using goniometer (OCA 20, Future Digital Scientific, Garden City, NY) via needle in sessile drop method. 5 μL of water was dispensed onto the surface and the contact angle was measured continuously in real time. The volume of the drop was then increase by 5 μL at a rate of 1 μL/s, then decreased by 5 μL at 1 μL/s. This cycle repeated 4 times for each sample in order to get an accurate reading of the two angles.

Surface chemical characterization. X-ray Photoelectron Spectroscopy (XPS) was used to assess the surface chemical composition of the hierarchical structures. Three samples were used for each condition, and means were determined. A Physical Electronics (PHI) Quantera II spectrometer equipped with an Al anode source for X-ray generation was used to record the XPS spectra (BioInterface Institute, McMaster University). XPS results were obtained at 45° take-off angles with a pass energy of 224 eV. The atomic percentages of carbon, oxygen, fluorine, nitrogen and silicon were calculated using the instrument's software.

Whole human blood assays. Whole human blood was collected from healthy donors in BD heparinized tubes. All donors provided signed written consent and the procedures were approved by the McMaster University Research Ethics Board. Blood sessile drop contact angle was measured at room temperature using the goniometer. The extent of blood adherence was evaluated by dipping each sample in human whole blood and resuspending the adhered blood to each surface by transferring each substrate in a well and adding 700 μL of water. To ensure the adhered blood was transferred in solution, samples were placed on a shaker for 30 minutes. 200 μL of each well was transferred to a 96 well and the absorbance was measured at 450 nm wavelength on a SpectraMax plate reader. To ensure reproducibility, 6 samples per each condition was evaluated. Samples were also incubated in blood for 30 minutes and washed subsequently by dipping in water two times to evaluate the extent of stickiness of the surfaces.

Alginate assay for simulating fouling. A solution of 1% w/v sodium alginate in milli-Q water was made with constant stirring. The extent of alginate adhesion to different sample conditions was assessed by incubating each sample in the alginate solution and subsequently weighing the sample. Samples were also weighed before being subject to alginate solution in order to calculate the amount of the adhered alginate.

Biofilm Adherence assays. *Pseudomonas aeruginosa* PAO1 (*P. aeruginosa*) and *Staphylococcus aureus* USA300 JE2 (*S. aureus*) were streaked from frozen onto LB agar and grown overnight at 37° C. From this, overnight cultures in LB broth were diluted 1/100 in MOPS-minimal media supplemented with 0.4% glucose and 0.5% casamino acids (TekNova, United States) for *P. aeruginosa* (45), or TSA media supplemented with 0.4% glucose and 3% NaCl for *S. aureus* (46). A 24-well polystyrene assay plate (Corning, United States) was prepared by inserting a single treated or untreated surface into each well, then subsequently flooding each well with 2 mL of the bacterial suspension. The assay plates were then incubated without shaking at 37° C. for 72 hours for *P. aeruginosa* and 24 hours for *S. aureus*, to allow biofilms to form. Post incubation, the surfaces were removed from each well using sterile forceps and washed extensively with sterile water to remove planktonic bacterial cells. Biofilms attached to the surfaces were stained with 0.1% crystal violet, then solubilized in 30% acetic acid. Bacterial suspensions, and solubilized crystal violet, were transferred to a 96-well microtiter plate (Corning, United States) and optical density (OD) was measured at 600 nm and 570 nm using a Tecan Infinite m1000 plate reader (Tecan, United States). Relative biofilm adherence was calculated by the ratio of biofilm adhered (OD570) to culture density (OD600).

Scanning Electron Microscopy—Bacteria Biofilm Fixation. *S. aureus* and *P. aeruginosa* biofilms were grown on polystyrene and polyolefin surfaces as described in the previous section. Samples were then placed in a 0.25% glutaraldehyde solution (in sodium cacodylate buffer) for fixation. Samples were subsequently rinsed with buffer before being stained with osmium tetraoxide. Samples were then sequentially dehydrated with ethanol solutions from 25% (in Milli-Q water) to 100%. Finally, samples were critically point dried (Leica Microsystems, Wetzlar, Germany) and sputter coated with 3 nm of platinum before examination under SEM. Samples were imaged using a JEOL 7000F (JEOL, Peabody, MA) at an accelerating voltage of 4 keV. Images were artificially coloured to improve recognition of bacteria using GIMP (GIMP 4.0).

Bacteria contact touch assay. An overnight culture of *Escherichia coli* MG1655 (*E. coli*) harboring pUA66-GadB (47), which constitutively expresses high levels of GFP, was grown in LB with 50 μg/ml kanamycin then pelleted. Cells were then re-suspended in 1/50 of the original volume of the culture to create a concentrated cell suspension. Agar plugs were made from 3% agar by dissolving 3 grams of agar in 100 mL water with a magnetic stirrer at room temperature. The temperature was then raised to 95° C. while stirring for 20 minutes, then the solution was poured into petri dishes and cooled in room temperature. Once solidified, agar plugs were harvested from the cooled agar plated by poking tubes with approximately 15 mm diameter in it. 20 μL of 50× concentrated *E. coli* overnight culture was added to each agar plug, under a laminar air flow in a biosafety cabinet, and allowed the excess media to absorb within the agar, creating a layer of the bacteria on top of the agar. Subsequently, the bacteria infused agar plugs were contacted with PS-Planar, PS-SiNP-Shrunk, PO-Planar, PO-SiNP-Shrunk surfaces for 10 seconds, allowing the *E. coli* to transfer and stick to them. The surfaces were then analyzed using a Chemidoc imaging system (BioInterface Institute, McMaster University) by fluorescein channel.

Bacterial transfer to human skin. In a similar method described in bacteria contact touch assay section, the contaminated PS-Planar, PS-SiNP-Shrunk, PO-Planar, PO-SiNP-Shrunk surfaces were touched with human skin and the extent of bacteria transfer were analyzed. This was done through a handheld fluorescent reader provided by OPTISOLVE®, enabling imaging various surfaces and assessing their extent of contamination in real time.

Whole human blood clotting assay and scanning electron microscopy. In order to investigate the blood clot repellency properties, 500 μL of citrated human whole blood and 500 μL of 25 mM $CaCl_2$ in 1 M HEPES buffer were added to a 24 well containing the treated samples and controls and incubated for 1 hour to allow for complete clot formation. Subsequently, samples were washed 2× with PBS. The quantification of the amount of the adhered clot was done by weighing the samples before and after the clotting assay. The weight difference was then reported and normalized to PS-Planar. The samples were fixed in 4% formaldehyde for 2 hours and coated with 3 nm Platinum. SEM was conducted to investigate blood clot formation and blood cell attachment.

Droplet digitization on patterned omniphobic surfaces and volume measurement. The patterned surface were dipped in blue dyed water to allowing the droplets to attach to the hydrophilic patterns. The surfaces were also dipped in 8:1000 Cy5 tagged anti IL-6 antibody allowing the droplets to attach to the hydrophilic sites, this was confirmed by imaging the wells by a Chemidoc imaging system (BioInterface Institute, McMaster University) by Cy5 channel. The volumes were measured using image processing software (Dataphysics SCA 20) on Digital Scientific OCA20 goniometer (Garden City, NY, USA).

Detection of IL6 on patterned omniphobic surface. The patterned surfaces hydrophilic wells were treated with 10% APTES solution for 3 hours, followed by 10 min sonication in DI water. This was then followed by treatment in EDC/NHS (2 mM EDC and 5 mM NHS in 0.1 M MES buffer) mixed with 1:100 ratio of capture antibody to initiate the carbodiimide cross-linking reaction and 1 μl of the solution was pipetted on to each well and was incubated overnight. Subsequently the wells were block by 2% BSA for an hour. The samples were then dipped into buffer containing 2500 pg/mL of IL-6 digitizing the solution on to the substrate. These droplets were let for 1 hour before washing in TBST and TBS. Following this the surfaces were dipped in 8:1000 Cy5 tagged anti-IL6 antibody and incubated for 1 hour, followed by a final wash in TBST and TBS. The Binding of IL6 was confirmed by imaging the wells by a Chemidoc imaging system (BioInterface Institute, McMaster University) by Cy5 channel.

DISCUSSION

Omniphobic Surfaces with Hierarchical Structures

Figure 1:
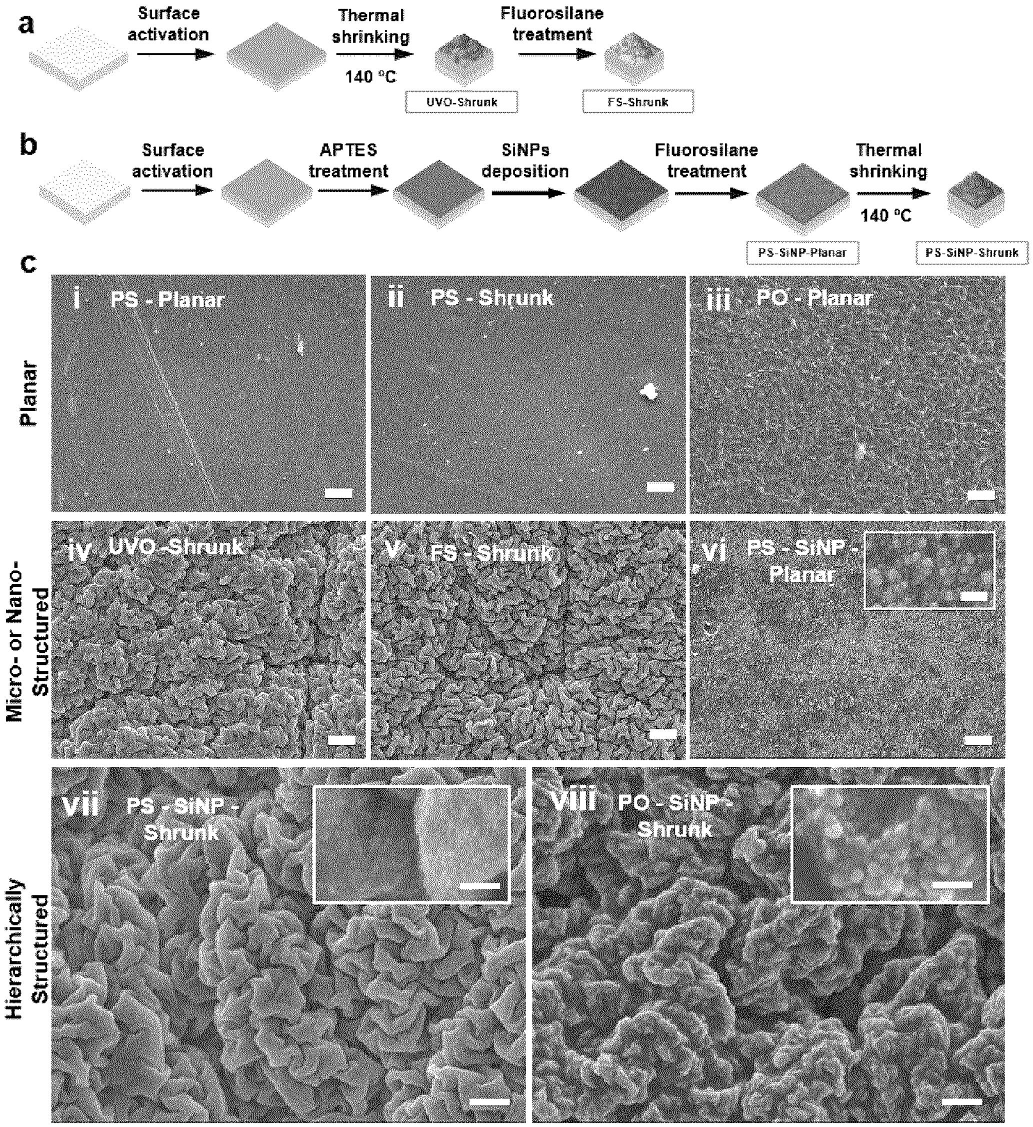
FIG. 1 shows schematics illustrating exemplary processes for fabricating omniphobic surfaces and wraps in a) and b) with corresponding scanning electron microscopy (SEM) images in exemplary embodiments of the application shown in part c).

In order to create a flexible omniphobic wrap, the role of microstructuring, nanostructuring, and hierarchical structuring—combining features with nanoscale and microscale dimensions—into a heat-shrinkable polymer substrate was first investigated. Microstructuring was induced by Ultraviolet-Ozone (UVO) activation of the pre-strained polystyrene (PS) substrate, followed by thermal shrinking. This processing resulted in the creation of wrinkles on the PS substrate (UVO-Shrunk) due to the stiffness difference between the surface layer and the bulk caused by the UVO treatment (FIG. 1*a*). Samples without surface activation were also collected and shrank to assess the planar behavior of the surface (PS-Planar and PS-Shrunk). As another variation of the microstructured surface, the UVO-Shrunk samples were subjected to fluorosilane (FS) treatment (FS-Shrunk), a commonly used process for lowering the surface energy (FIG. 1*a*) (48). Nanostructuring was induced by depositing 22 nm colloidal silica nanoparticles (SiNPs) from the respected solution on an aminosilane molecular linker seed layer (3-Aminopropyl)triethoxysilane (APTES) deposited onto the UVO treated PS as shown in FIG. 1*b*. Following the nano-scale modification, an FS layer was deposited on the surface yielding in PS-SiNP-Planar substrates (FIG. 1*b*) such that the hydroxyl groups on the SiNPs enabled direct deposition of fluorosilane (FIG. 1*b*). Hierarchical structures were created by thermally shrinking the nanostructured samples (PS-SiNP-Planar) in an oven or using a heat gun to create an underlying layer of microscale wrinkles onto the nanostructured surfaces (FIG. 1*b*) yielding in the optimal repellent surface. As a universally-applicable material, polyolefin wraps were similarly processed to create hierarchical structures (PO-SiNP-Shrunk) leading to a flexible omniphobic surface. As a control sample, the pristine, unmodified wrap was also investigated (PO-Planar).

Figure 2:
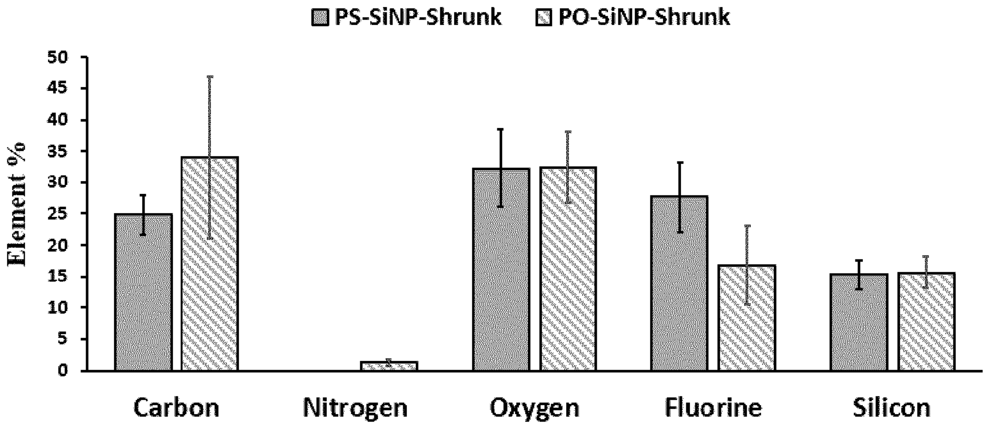
FIG. 2 shows the chemical composition of the hierarchical surfaces (PS-SiNP-Shrunk and PO-SiNP-Shrunk) using X-ray photoelectron spectroscopy (XPS) in exemplary embodiments of the application.
Figure 3:
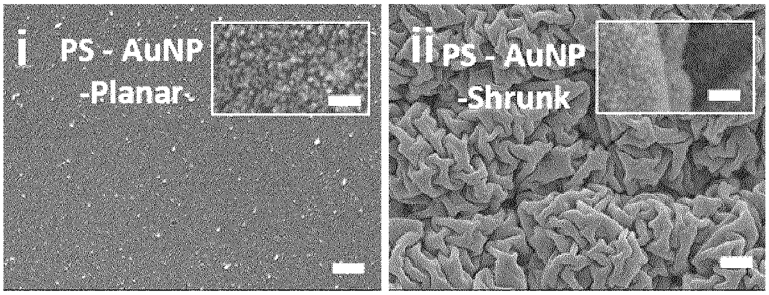
FIG. 3 shows SEM images of PS-AuNP-Planar and PS-AuNP-Shrunk in exemplary embodiments of the application.

The morphology of the fabricated surfaces was assessed using scanning electron microscopy (SEM) (FIG. 1*c.i-viii*). FIGS. 1*c.iv* and *v* confirmed the microscale structures in form of wrinkles on UVO-Shrunk and FS-Shrunk samples, validating the buckling effect on thermally shrunk UVO modified PS polymer. However, PS-Shrunk samples which were not subject to UVO treatment, maintained their planar morphology (FIG. 1*c.ii*) similar to the PS-Planar (FIG. 1*c.i*) and PO-Planar (FIG. 1*c.iii*) surfaces. Nanoscale structures were observed on the PS-SiNP-Planar samples (FIG. 1*c.vi*), showing a layer of nanoparticles with their respected size, as validated by FIG. 1*c.vi* insets, on the APTES treated PS. The hierarchical structures in PS-SiNP-Shrunk and PO-SiNP-Shrunk are shown in FIG. 1*c.vii* and *viii*. The PO-SiNP-Shrunk is showing more wrinkles in the submicron range compared to the PS-SiNP-Shrunk which can be attributed to the larger thermally-induced strain for PO (95%) (49) compared to PS (40%) (34). Although the chemical surface modification with fluorosilane was not visible in the SEM images, these were verified for the hierarchical surfaces using X-ray Photoelectron Spectroscopy (XPS) (FIG. 2). To test whether the fabrication method is applicable to other types of nanoparticles, in a comparable production method to PS-SiNP-Planar and PS-SiNP-Shrunk, 12 nm gold nanoparticles (AuNPs) were incorporated in the surfaces yielding in PS-AuNP-Planar and further PS-AuNP-Shrunk which the fabrication method and SEM images are shown in FIG. 3. Provided is a rapid, straightforward method to produce bulk repellent films that are applicable on various settings and promising for industrial setups by the incorporation of hierarchical structures within heat-shrinkable polymers.

To evaluate the omniphobicity of the developed structures, and compare the behavior of planar, microstructured, nanostructured, and hierarchical surfaces, the static contact angle of various test liquids, such as milli-Q grade water (surface tension of 72.75 mJ/m2 (50)), hexadecane (surface tension of 27.76 mJ/m2 (50)), human whole blood (surface tension of approximately 55 mJ/m2 (8)), and various ethanol/water concentrations, was measured (FIG. 4*a*). The polystyrene surfaces, PS-Planar and PS-Shrunk, showed hydrophilic characteristics (θ<90°) as they had water contact angles of 78.9±1.3° and 81±5°, respectively. The micro-structured surfaces, UVO-Shrunk and FS-Shrunk were hydrophobic, demonstrating contact angles of 100±6° and 125±4°, which, while not wishing to be limited by theory, can be explained by the Cassie model. The higher water contact angle recorded for FS-Shrunk can be attributed to the decrease in the surface free energy leading to a higher Young's contact angle and Cassie contact angle. The nano-textured surface, PS-SiNP-Planar, showed water contact angles of 135±4°, having a higher repellency towards water than FS-Shrunk (125±4°). The combination of micro-, nano-structures, and chemical modification with FS on PS achieved hydrophobicity of more than 150° (155° for PS-SiNP-Shrunk). Furthermore, the same repellency trend is observed for AuNP treated surfaces (PS-AuNP-Planar and PS-AuNP-Shrunk). The increase in the number of length-scales (hierarchical structures) elevates the contact angles by reducing the solid-liquid contact area, providing more trapped air in the underlying interface comparing to single length-scales (micro- or nano-structures) (23). This can also be approximated by rewriting Cassie-Baxter relation recursively (23,51). Additionally, the hierarchical structures have shown to improve the stability of the solid-liquid-air interface, inhibiting filling of the air pockets within the structure (20). This demonstrates that having hierarchical structures combined with the FS modification improved the hydrophobicity by approximately 20°, positioning these surfaces in the super-hydrophobic range.

As a common measure for omniphobicity, the surface's oleophobicity was determined by measuring the hexadecane contact angle. The planar surfaces (PS-Planar and PS-Shrunk) were oleophilic, with contact angles too low to accurately be measured. According to Young's relation, comparing hexadecane contact angle to water for the same surface, a smaller contact angle for hexadecane (lower surface tension) is predicted. The microstructures present on the UVO-shrunk samples did not make the surface less oleophilic; however, FS-shrunk samples, decreased the degree of oleophilicity (26±7°) due to the effect of fluorosilanization on lowering the surface energy. PS-SiNP-Planar surfaces revealed a significantly higher hexadecane contact angle (55±3°) compared to the wrinkled surfaces (UVO-shrunk and FS-Shrunk). Nanoparticles create a re-entrant texture and a more effective Cassie state for low surface tension liquids compared to the concave structure of the wrinkles (20,23). The combination of both micro- and nano-structures observed in the PS-SiNP-Shrunk samples led to a remarkable increase in oleophobicity as the contact angles reached 123±5°. This type of omniphobicity is also present with up to 70% ethanol, which has an ultralow surface tension (25.48 mN/m (52)). In the hierarchical structures, the addition of nanoparticles distorts the concave texture of the wrinkles, allowing improved repellence of lower surface tension liquid compared to microstructures. Additionally, having wrinkles along with the nanoparticles provides a higher fraction of air beneath the droplet. The findings from water and hexadecane contact angle measurements indicate that hierarchical structuring enhances the water and hexadecane contact angles compared to micro- or nano-structured surfaces, resulting in improved omniphobicity.

Self-Cleaning and Anti-Biofouling Omniphobic Surfaces

To further validate the self-cleaning characteristics of the developed surfaces under biological conditions, the contact angle of whole human blood on each surface was examined. PS-SiNP-Shrunk (micro- and nano-structured surface) maintained a high contact angle of 142±7° (FIG. 4*a*). This predicts a self-cleaning and anti-biofouling behaviour for the hierarchical structures.

Additionally, the sliding angle of the surfaces was measured, which is a measure for repellency and adhesiveness. As shown in FIG. 4*a*, a sliding angle of below 5° was recorded for the hierarchical surfaces (PS-SiNP-Shrunk, PO-SiNP-Shrunk), which indicates the low adhesion and mobility of the water droplet on the developed surfaces. The ability of the droplet to slide off the hierarchical surface with a low sliding angle (<5°) is due to the unevenness of the wrinkles as well as the presence of nanoparticles (FIG. 1*c.vii,viii*). As the surface is tilted, the droplet detaches itself sequentially from small areas due to the rough nature of the surface (53). This results in a smaller adhesive force compared to the control groups, which have a larger surface in contact with the water droplet. All other control groups (FIG. 4*a*) did not exhibit sliding except for the PO wrap (PO-Planar) which showed a sliding angle of 35°. The advancing/receding contact angles and the resultant contact angle hysteresis are also relevant metrics of omniphobicity and repellency since lowering the solid/liquid interfacial area results in a decrease in contact angle hysteresis (23,54). The high advancing/receding contact angle (~140°) and low contact angle hysteresis (~10°) observed for the PS-SiNP-Shrunk and PO-SiNP-Shrunk (FIG. 4*c*) allow for the low sliding angle (FIG. 4*c*) and bouncing behavior of these surfaces (FIG. 4*b*). The sliding angles calculated from the advancing/receding contact angles (2.5° and 5.3° for PS-SiNP-Shrunk and PO-SiNP-Shrunk) are well in line with the measured sliding angles. Low contact angle hysteresis and sliding angles as well as the high advancing/receding contact angles, enables water to stay in a suspended Cassie state (37), which is of relevance for achieving self-cleaning, anti-fouling properties. The PS-AuNP-Shrunk surfaces also showed sliding angles below 5°.

Given the exceptional omniphobic performance of the hierarchical structures, these structures were implemented on flexible polyolefin wraps commonly used as packaging material (e.g. food industry). Similar to polystyrene, hierarchically-structured polyolefin wraps (PO-SiNP-Shrunk) demonstrated super-hydrophobicity with contact angles of 154°, oleophobicity (hexadecane contact angle=124±2°), and showed repellency towards blood with contact angles of 144±5° (FIG. 4*a*). Furthermore, when the material was bent, these surfaces show a blood contact angle that is comparable to the unbent samples, demonstrating their omniphobic behavior under different form factors. These findings display remarkable omniphobic performance for a flexible surface, which holds the benefit of being easily placed on a wide range of materials.

Using a blood adherence assay, the repellant behavior of the surfaces developed here were evaluated under conditions that are relevant for blood contacting medical devices and implants. In this assay, the surfaces were submerged in blood and were subsequently agitated in water to quantify the extent of blood adhesion by measuring absorbance (FIG. 5*a*). The results reveal that the hierarchical surfaces (PS-SiNP-Shrunk) significantly reduce blood adherence compared to the original polystyrene surfaces by 93% (PS-Planar and PS-Shrunk). Furthermore, PS-SiNP-Planar and FS-Shrunk surfaces reduced blood adhesion by 57% and 44% respectively compared to the untreated samples. These surfaces were also visually inspected after they were incubated in blood for 30 minutes, and washed with water (FIG. 5*b*). The blood repellency of the hierarchical surface (PS-SiNP-Shrunk) was clearly evident; while all other surfaces remained stained after washing, the hierarchical surface did not contain a visible stain. As expected, creating these hierarchical structures onto the flexible PO wraps achieved similar results. The hierarchical PO wraps (PO-SiNP-Shrunk) reduced blood adherence by 85% compared to their planar (PO-Planar) counterparts, offering a flexible surface that can be placed on a wide range of materials. These experiments demonstrate that degree of omniphobicity determines the degree of blood repellency and confirm the superior repellency of the hierarchical surfaces.

In the blood staining assay using PS-AuNP-Shrunk (FIG. 6*a*), the surfaces were submerged in heparinized blood and were subsequently agitated in PBS to quantify the extent of blood adhesion by measuring absorbance (FIG. 6*a*). The results revealed that the hierarchical surfaces (PS-AuNP-Shrunk) significantly reduced blood adherence compared to the original polystyrene surfaces by 90% (PS-Planar and PS-Shrunk). The PS-FS-Planar surface showed a 13% increase in blood adhesion which may be due to the hydrophobic-hydrophobic interaction of these class of surfaces, making them adherent towards proteins presented in blood. Furthermore, PS-AuNP-Planar surfaces reduced blood adhesion by 29% compared to the untreated samples. These surfaces were also visually inspected after they were incubated in blood for 30 minutes and washed with water (FIG. 6*a*). The blood repellency of the hierarchical surface (PS-AuNP-Shrunk) was clearly evident; while all other surfaces remained stained after washing, the hierarchical surface did not contain a visible stain. In order to investigate the anticoagulant properties of the surfaces, they were subjected to citrated whole blood and the clotting was initiated by the introduction of calcium chloride. The extent of which clot was adhered to each surface was verified through weighing surfaces before and after clotting assay. As shown in FIG. 6*b* the hierarchically structured samples (PS-AuNP-Shrunk) significantly attenuated clot adherence due to the stable Cassie state on these class of surfaces. On the other hand, planar and nanostructured surfaces demonstrated elevated clot weight. The clotting assay is also verified through the SEM images shown in FIG. 6*cii*, as there is significantly less blood cell accumulation and blood clot formation whereas the unmodified surface demonstrated abundance of blood cells. These experiments again demonstrate that degree of omniphobicity determines the degree of blood repellency and confirm the superior repellency of the hierarchical surfaces.

In addition to the assessment of blood adherence, the effect of the developed structures on the anti-biofouling behaviour of the surfaces was studied using various bacterial adhesion assays (FIG. 7). The biofilm formation of *Pseudomonas aeruginosa* (*P. aeruginosa*), and a gram negative bacterium, and *Staphylococcus aureus* (*S. aureus*), a gram positive bacterium, was evaluated on various surfaces to investigate whether micro, nano, or hierarchical structuring has a significant effect on reducing biofilm attachment. *P. aeruginosa* and *S. aureus* are clinically relevant as they cause hospital-acquired infections, develop drug resistance, and are adherent to various surfaces due to the nature of their biofilm (4,55). To simulate biofilm attachment, an assay using alginate, a rich polysaccharide in bacterial extracellular polymeric substance (EPS), was performed. Untreated, fluorosilanized, and nanoparticle treated surfaces all exhibited about the same amount of attachment of alginate, showing relative values of about 1, while PS-AuNP-Shrunk and PS-SiNP-Shrunk surfaces demonstrated more than a 10 time decrease in its alginate adherence (FIG. 8) (55,56). In the biofilm assay, the surfaces were first suspended in bacterial suspensions that promote biofilm formation, they were stained using crystal violet, and the crystal violet was desorbed from the surface to quantify the amount of the stained biofilm using absorption measurements (FIG. 7*a,b*) It is evident from the biofilm assay that the hierarchical structures effectively attenuate biofilm formation compared to the other control groups (reduced by ~85% compared to PS-Planar) for both *S. aureus* and *P. aeruginosa*. Although the microstructured (PS-FS-Shrunk) and nanostructured surfaces (PS-SiNP-Planar) also reduced biofilm formation (66% and 78% for *S. aureus,* 11% and 62% for *P. aeruginosa*), they did not achieve the same level of biofilm attenuation. As observed with the blood adherence assay, anti-biofouling follows the same trend as the omniphobicity. While not wishing to be limited by theory, this may be explained by the occurrence of Cassie state in the hierarchical surfaces, which leads to more air pockets and less anchoring sites on these surfaces. The reduced interaction between the liquid contaminants and the surface may decrease biofilm abundance and attachment on the hierarchical surfaces (3,4,7,57).

To visualize the interaction of the *P. aeruginosa* and *S. aureus* biofilms with the hierarchical surfaces, scanning electron microscopy (SEM) was performed on mature biofilms formed on these surfaces and compared them to planar polystyrene surfaces (FIG. 7*c*). These images demonstrate the abundance and stacking of sphere-shaped *S. aureus* bacteria on the untreated polystyrene surface (PS-Planar), whereas adding the hierarchical texture significantly decreased the amount of adhered *S. aureus* (FIG. 7*c.ii*). Additionally, the biofilm of *P. aeruginosa*, a rod-shaped bacterium, was clearly evident on the untreated surfaces; however, this was significantly reduced in the hierarchical (PS-SiNP-Shrunk) sample (FIG. 7*c.iv*). These findings are well in agreement with the quantitative crystal violet assay and confirm the anti-biofouling behavior of the hierarchical samples. As expected, when the hierarchical structuring was implemented on the surface of the flexible PO wraps, same type of anti-biofouling behaviour was visualized through SEM of the biofilms (FIG. 9*a.i-iv*).

One factor in the spread of infections is the transfer of bacteria to an intermediate surface, which would serve as a niche point for biofilm production or further bacterial transfer. To evaluate the ability of the surfaces in reducing the spread of infection, a touch-assay was designed to quantify the transfer of bacteria from contaminated to clean surfaces. In this assay, agar plugs dipped in GFP expressing *E. coli* cultures were used to simulate contaminated human skin. Planar and hierarchical flexible wraps were contacted with these agar plugs, and measured their corresponding fluorescence (FIG. 9*b*). The hierarchical wrap (PO-SiNP-Shrunk) showed a 20 time decrease in the fluorescent signal, indicating that there is significantly less *E. coli* transferred to the treated surfaces. A similar experiment was performed on hierarchical polystyrene surfaces, showing a 15-fold decrease in the fluorescent signal on the treated surface compared to planar surfaces. These results demonstrate the promise that these flexible hierarchical wraps hold for covering surfaces that pose a high risk for transferring infections. To demonstrate the applicability of the hierarchical wraps for reducing contamination on everyday objects, a key and a pen were covered with the hierarchical wraps and compared their anti-biofouling performance with objects covered with untreated wraps (FIG. 9*c*). Subsequently, the wrapped objects were subject to the touch-assay with the *E. coli* infused agar plugs, and the extent of bacteria adhesion was evaluated by a fluorescent scanner (FIG. 9*c*).

A high fluorescent signal was observed for the untreated wraps showing an elevated amount of GFP expressing *E. coli* on their surface (FIG. 9*c.iii,v*). Interestingly, the objects covered with the hierarchical wraps showed little or no measurable fluorescence signal (FIG. 9*c.iv,vi*). In addition, the performance of the surfaces in halting the transfer of bacterial contamination was investigated. This surface and a control surface were "touched" with *E. coli* infused agar plugs and then stamped onto a human finger. The transfer of the bacteria from hierarchical and control surfaces onto human skin was imaged using a handheld fluorescent reader designed to assess surface contamination levels (FIGS. 9*d* and 9*e*). These images clearly demonstrate that building hierarchical structuring into the wraps significantly reduce the transfer of bacteria from a contaminated surface through an intermediate surface to the human skin. It is also interesting to note that the hierarchical wraps hold their repellent properties, under strain and while conforming to different form factors.

Patterning Planar Hydrophilic Regions in Hierarchical Omniphobic Structures

Hydrophilic patterns were introduced in the hierarchically structured surfaces through a benchtop masking method, and hydrophilic wells created as demonstrated in FIG. 10*a.i*. Briefly, a vinyl mask was patterned on the polystyrene surface and subsequently were proceeded by the modification steps as described in the methods section. The vinyl masking results in the covered regions not being exposed to the UVO treatment therefore, not having the stiff layer formed. The vinyl mask also remained on the substrate through all of the subsequent steps, and was taken off before thermal shrinkage. This method leads to untreated polystyrene with a planar morphology under the masked regions, and hierarchical structures on the rest of the surface after the heat treatment (FIG. 10*a.i*). The developed wells were exposed to $H_2SO_4$ causing them to become more hydrophilic, enabling them to digitize water droplets (FIG. 10*a.ii*) as well as a fluorescent dye (Cy5 tagged anti IL-6 antibody, FIG. 10*a.iii*) which demonstrates that the hierarchical sites have repelled the water/antibody. The volume of the droplets on the patterns was further quantified to evaluate the consistency from well to well. As shown in FIG. 10*b*, the volume was controlled by altering the surface properties of the wells, showing an increase in the amount of the adhered water in the case of treating the wells with $H_2SO_4$. Also, the relatively low error bar indicates that wells hold a consistent amount of water which is a relevant factor when performing biosensing assays.

To demonstrate an application of the digitized droplets on the patterned substrates, a fluorescence-based biosensing assay was conducted. For this, an IL-6 assay was performed by means of APTES treatment and EDC-NHS chemistry on the hydrophilic wells, to then perform the IL-6 assay by dipping the wells in solutions with regards to the assay as described in the methods section. Utilizing EDC-NHS chemistry, the capture antibody was immobilized allowing for the capture of the IL-6. The IL-6 was then detected by streptavidin-biotin system with Cy5 fluorescent label. As a control, a blank sample was included which was not subjected to the IL-6 during the assay. The fluorescence intensity was then measured by a fluorescent scanner with Cy5 channel (FIG. 10*d*). As shown in FIG. 10*c,d*, the significant difference between the fluorescence intensity of the blank and IL-6 spiked solutions demonstrate that the digitized omniphobic surfaces can be used for localized detections and biological assays.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE APPLICATION

1. Fürstner R, Barthlott W, Neinhuis C, Walzel P. Wetting and Self-Cleaning Properties of Artificial Superhydrophobic Surfaces. Langmuir [Internet]. 2005 Feb. 1; 21(3): 956-61. Available from: https://doi.org/10.1021/1a0401011
2. Parkin I P, Palgrave R G. Self-cleaning coatings. J Mater Chem. 2005; 15(17):1689-95.
3. Vogel N, Belisle R A, Hatton B, Wong T-S, Aizenberg J. Transparency and damage tolerance of patternable omniphobic lubricated surfaces based on inverse colloidal monolayers. Nat Commun [Internet]. 2013 Jul. 31; 4:2176. Available from: https://doi.org/10.1038/ncomms3176
4. MacCallum N, Howell C, Kim P, Sun D, Friedlander R, Ranisau J, et al. Liquid-infused silicone as a biofouling-free medical material. ACS Biomater Sci Eng. 2014; 1(1):43-51.
5. Puckett S D, Taylor E, Raimondo T, Webster T J. The relationship between the nanostructure of titanium surfaces and bacterial attachment. Biomaterials [Internet]. 2010; 31(4):706-13. Available from: http://www.sciencedirect.com/science/article/pii/S0142961209010333
6. Colon G, Ward B C, Webster T J. Increased osteoblast and decreased *Staphylococcus epidermidis* functions on nanophase ZnO and TiO2. J Biomed Mater Res—Part A. 2006;
7. H. K. Nguyen D, T. H. Nguyen V, Truong V K, Sbarski I, Wang J, Balčytis A, et al. Role of topological scale in the differential fouling of *Pseudomonas aeruginosa* and *Staphylococcus aureus* bacterial cells on wrinkled gold-coated polystyrene surfaces. Vol. 10, Nanoscale. 2018.
8. Crawford R J, Webb H K, Truong V K, Hasan J, Ivanova E P. Surface topographical factors influencing bacterial attachment. Adv Colloid Interface Sci [Internet]. 2012; 179-182:142-9. Available from: http://www.sciencedirect.com/science/article/pii/S0001868612000978
9. Jokinen V, Kankuri E, Hoshian S, Franssila S, Ras R. Superhydrophobic Blood-Repellent Surfaces. Vol. 30, Advanced Materials. 2018. 1705104 p.
10. Movafaghi S, Leszczak V, Wang W, Sorkin J A, Dasi L P, Popat K C, et al. Hemocompatibility of Superhemophobic Titania Surfaces. Adv Healthc Mater [Internet]. 2017 Feb. 1; 6(4):1600717. Available from: https://doi.org/10.1002/adhm.201600717
11. Wong T S, Kang S, Tang S, J Smythe E, Hatton B, Grinthal A, et al. Bioinspired self-repairing slippery surfaces with pressure-stable orrmiphobicity. Vol. 477, Nature. 2011. 443-447 p.
12. Badv M, Imani S M, Weitz J I, Didar T F. Lubricant-infused surfaces with built-in functional biomolecules exhibit simultaneous repellency and tunable cell adhesion. ACS Nano. 2018; 12(11):10890-902.
13. Villegas M, Cetinic Z, Shaken A, Didar T F. Fabricating smooth PDMS microfluidic channels from low-resolution 3D printed molds using an omniphobic lubricant-infused coating. Anal Chim Acta [Internet]. 2018; 1000:248-55. Available from: https://doi.org/10.1016/j.aca.2017.11.063
14. Hosseini A, Villegas M, Yang J, Badv M, Weitz J I, Soleymani L, et al. Conductive Electrochemically Active Lubricant-Infused Nanostructured Surfaces Attenuate Coagulation and Enable Friction-Less Droplet Manipulation. Adv Mater Interfaces. 2018; 5(18):1800617.
15. Osborne M, Aryasomayajula A, Shakeri A, Selvaganapathy P R, Didar T F. Suppression of Biofouling on a Permeable Membrane for Dissolved Oxygen Sensing Using a Lubricant-Infused Coating. ACS Sensors [Internet]. 2019 Mar. 22; 4(3):687-93. Available from: https://doi.org/10.1021/acssensors.8b01541
16. Kim P, Kreder M J, Alvarenga J, Aizenberg J. Hierarchical or Not? Effect of the Length Scale and Hierarchy of the Surface Roughness on Omniphobicity of Lubricant-Infused Substrates. Nano Lett [Internet]. 2013 Apr. 10; 13(4):1793-9. Available from: https://doi.org/10.1021/n14003969
17. Lafuma A, Quere D. Superhydrophobic states. Nat Mater [Internet]. 2003; 2(7):457-60. Available from: https://doi.org/10.1038/nmat924
18. Wenzel R N. RESISTANCE OF SOLID SURFACES TO WETTING BY WATER. Ind Eng Chem [Internet]. 1936 Aug. 1; 28(8):988-94. Available from: https://doi.org/10.1021/ie50320a024
19. Cassie A B D, Baxter S. Wettability of porous surfaces. Trans Faraday Soc. 1944; 40:546.
20. Nosonovsky M. Multiscale Roughness and Stability of Superhydrophobic Biomimetic Interfaces. Langmuir [Internet]. 2007 Mar. 1; 23(6):3157-61. Available from: https://doi.org/10.1021/1a062301d
21. Shirtcliffe N J, McHale G, Newton M I, Chabrol G, Perry C C. Dual-scale roughness produces unusually water-repellent surfaces. Adv Mater. 2004; 16(21): 1929-32.
22. Lin P C, Yang S. Mechanically switchable wetting on wrinkled elastomers with dual-scale roughness. Soft Matter. 2009; 5(5):1011-8.
23. Kota A K, Kwon G, Tuteja A. The design and applications of superomniphobic surfaces. Npg Asia Mater [Internet]. 2014 Jul. 4; 6:e109. Available from: https://doi.org/10.1038/am.2014.34
24. Hensel R, Neinhuis C, Werner C. The springtail cuticle as a blueprint for omniphobic surfaces. Chem Soc Rev [Internet]. 2016; 45(2):323-41. Available from: http://dx.doi.org/10.1039/C5CS00438A
25. Zhang J, Seeger S. Superoleophobic Coatings with Ultralow Sliding Angles Based on Silicone Nanofilaments. Angew Chemie Int Ed [Internet]. 2011 Jul. 11; 50(29):6652-6. Available from: https://doi.org/10.1002/anie.201101008
26. Mazumder P, Jiang Y, Baker D, Carrilero A, Tulli D, Infante D, et al. Superorrmiphobic, transparent, and antireflection surfaces based on hierarchical nanostructures. Nano Lett. 2014; 14(8):4677-81.
27. Deng X, Mammen L, Butt H-J, doris vollmer. Candle Soot as a Template for a Transparent Robust Superamphiphobic Coating. Vol. 335, Science (New York, N.Y.). 2011. 6'7-70 p.
28. Tuteja A, Choi W, Mabry J M, McKinley G H, Cohen R E. Robust omniphobic surfaces. Proc Natl Acad Sci USA [Internet]. 2008/11/10. 2008 Nov. 25; 105(47): 18200-5. Available from: https://www.ncbi.nlm.nih.gov/pubmed/19001270
29. Zhu P, Kong T, Tang X, Wang L. Well-defined porous membranes for robust omniphobic surfaces via microfluidic emulsion templating. Nat Commun [Internet]. 2017 Jun. 12; 8:15823. Available from: https://doi.org/10.1038/ncomms 15823
30. Wu W, Wang X, Wang D, Chen M, Zhou F, Liu W, et al. Alumina nanowire forests via unconventional anodization and super-repellency plus low adhesion to diverse liquids. Chem Commun. 2009; (9):1043-5.
31. Chu Z, Seeger S. Superamphiphobic surfaces. Chem Soc Rev [Internet]. 2014; 43(8):2784-98. Available from: http://dx.doi.org/10.1039/C3CS60415B
32. Pendurthi A, Movafaghi S, Wang W, Shadman S, Yalin A P, Kota A K. Fabrication of Nanostructured Omniphobic and Superomniphobic Surfaces with Inexpensive CO2 Laser Engraver. ACS Appl Mater Interfaces [Internet]. 2017 Aug. 9; 9(31):25656-61. Available from: https://doi.org/10.1021/acsami.7b06924
33. Gabardo C M, Yang J, Smith N J, Adams-McGavin R C, Soleymani L. Programmable Wrinkling of Self-Assembled Nanoparticle Films on Shape Memory Polymers. ACS Nano [Internet]. 2016 Sep. 27; 10(9):8829-36. Available from: https://doi.org/10.1021/acsnano.6b04584
34. Gabardo C M, Zhu Y, Soleymani L, Moran-Mirabal J M. Bench-Top Fabrication of Hierarchically Structured High-Surface-Area Electrodes. Adv Funct Mater [Internet]. 2013 Jun. 25; 23(24):3030-9. Available from: https://doi.org/10.1002/adfm.201203220
35. Lin S, Lee E K, Nguyen N, Khine M. Thermally-induced miniaturization for micro- and nanofabrication: progress and updates. Lab Chip [Internet]. 2014; 14(18):3475-88. Available from: http://dx.doi.org/10.1039/C4LC00528G
36. Ware C S, Smith-Palmer T, Peppou-Chapman S, Scarratt L R J, Humphries E M, Balzer D, et al. Marine antifouling behavior of lubricant-infused nanowrinkled polymeric surfaces. ACS Appl Mater Interfaces. 2018; 10(4):4173-82.
37. Scarratt L R J, Hoatson B S, Wood E S, Hawkett B S, Neto C. Durable Superhydrophobic Surfaces via Spontaneous Wrinkling of Teflon AF. ACS Appl Mater Interfaces [Internet]. 2016 Mar. 16; 8(10):6743-50. Available from: https://doi.org/10.1021/acsami.5b12165
38. Schauer S, Worgull M, Holscher H. Bio-inspired hierarchical micro- and nano-wrinkles obtained via mechanically directed self-assembly on shape-memory polymers. Soft Matter [Internet]. 2017; 13(24):4328-34. Available from: http://dx.doi.org/10.1039/C7SM00154A
39. Efimenko K, Rackaitis M, Manias E, Vaziri A, Mahadevan L, Genzer J. Nested self-similar wrinkling patterns in skins. Nat Mater. 2005; 4(4):293-7.
40. Dramé A, Darmanin T, Dieng S Y, Taffin de Givenchy E, Guittard F. Superhydrophobic and oleophobic surfaces containing wrinkles and nanoparticles of PEDOT with two short fluorinated chains. RSC Adv [Internet]. 2014; 4(21):10935-43. Available from: http://dx.doi.org/10.1039/C3RA47479H
41. Howarter J A, Youngblood J P. Optimization of Silica Silanization by 3-Aminopropyltriethoxysilane. Langmuir [Internet]. 2006 Dec. 1; 22(26):11142-7. Available from: https://doi.org/10.1021/1a061240g
42. Shillingford C, MacCallum N, Wong T-S, Kim P, Aizenberg J. Fabrics coated with lubricated nanostructures display robust omniphobicity. Nanotechnology [Internet].

2013; 25(1):14019. Available from: http://dx.doi.org/10.1088/0957-4484/25/1/014019

43. Grabar K C, Freeman R G, Hommer M B, Natan M J. Preparation and Characterization of Au Colloid Monolayers. Anal Chem [Internet]. 1995 Feb. 15; 67(4):735-43. Available from: https://pubs.acs.org/doi/abs/10.1021/ac00100a008
44. Zhu Z, Zhu T, Liu Z. Raman scattering enhancement contributed from individual gold nanoparticles and interparticle coupling. Nanotechnology [Internet]. 2004; 15(3):357-64. Available from: http://dx.doi.org/10.1088/0957-4484/15/3/022
45. AU—O'Toole G A. Microtiter Dish Biofilm Formation Assay. JoVE [Internet]. 2011; (47):e2437. Available from: https://www.jove.com/video/2437
46. Mootz J M, Benson M A, Heim C E, Crosby H A, Kavanaugh J S, Dunman P M, et al. Rot is a key regulator of *Staphylococcus aureus* biofilm formation. Mol Microbiol [Internet]. 2015/02/26. 2015 April; 96(2):388-404. Available from: https://www.ncbi.nlm.nih.gov/pubmed/25612137
47. Zaslaver A, Bren A, Ronen M, Itzkovitz S, Kikoin I, Shavit S, et al. A comprehensive library of fluorescent transcriptional reporters for *Escherichia coli*. Nat Methods [Internet]. 2006 Jul. 21; 3:623. Available from: https://doi.org/10.1038/nmeth895
48. Erasmus E, Barkhuysen F A. Superhydrophobic cotton by fluorosilane modification. 2009;
49. Pegan J D, Ho A Y, Bachman M, Khine M. Flexible shrink-induced high surface area electrodes for electrochemiluminescent sensing. Lab Chip [Internet]. 2013; 13(21):4205-9. Available from: http://dx.doi.org/10.1039/C3LC50588J
50. Li D, Neumann A. Contact Angles On Hydrophobic Solid-surfaces And Their Interpretation. J Colloid Interface Sci. 1992; 148(1):190-200.
51. Herminghaus S. Roughness-induced non-wetting. Eur Lett [Internet]. 2000 October; 52(2): 165-70. Available from: https://doi.org/10.1209/epl/i2000-00418-8
52. Vazquez G, Alvarez E, Navaza J M. Surface Tension of Alcohol Water+Water from 20 to 50.degree. C. J Chem Eng Data [Internet]. 1995 May 1; 40(3):611-4. Available from: https://doi.org/10.1021/je00019a016
53. Ensikat H J, Ditsche-Kuru P, Neinhuis C, Barthlott W. Superhydrophobicity in perfection: the outstanding properties of the lotus leaf. Beilstein J Nanotechnol [Internet]. 2011 Mar. 10; 2:152-61. Available from: https://www.ncbi.nlm.nih.gov/pubmed/21977427
54. Wooh S, Vollmer D. Silicone Brushes: Omniphobic Surfaces with Low Sliding Angles. Angew Chemie Int Ed [Internet]. 2016 Jun. 6; 55(24):6822-4. Available from: https://doi.org/10.1002/anie.201511895
55. Boyd A, Chakrabarty A M. *Pseudomonas aeruginosa* biofilms: role of the alginate exopolysaccharide. J Ind Microbiol [Internet]. 1995; 15(3):162-8. Available from: https://doi.org/10.1007/BF01569821
56. Hall-Stoodley L, Costerton J W, Stoodley P. Bacterial biofilms: from the Natural environment to infectious diseases. Nat Rev Microbiol [Internet]. 2004 Feb. 1; 2:95. Available from: https://doi.org/10.1038/nrmicro821
57. Yuan Y, Hays M P, Hardwidge P R, Kim J. Surface characteristics influencing bacterial adhesion to polymeric substrates. RSC Adv [Internet]. 2017; 7(23):14254-61. Available from: http://dx.doi.org/10.1039/C7RA01571B

The invention claimed is:

1. A material comprising a substrate, at least one nanoparticle layer on at least a portion of the substrate and at least one omniphobic molecular layer on the nanoparticle layer, wherein the material comprises microstructures and nanostructures and the microstructures are provided from wrinkling a surface of the substrate and the nanostructures are provided from the at least one nanoparticle layer, and the portion of the substrate comprising the at least one nanoparticle layer and at least one omniphobic molecular layer form hierarchical structures that are omniphobic.

2. The material of claim 1, wherein the omniphobic molecular layer comprises a fluorosilane, a fluorocarbon, a fluoropolymer, or an organosilane, or mixtures thereof.

3. The material of claim 1, wherein the omniphobic molecular layer is a fluorosilane layer or monolayer and is formed using one or more compounds of the Formula I:

(I)

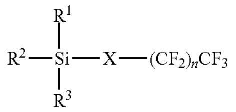

wherein

X is a single bond or is $C_{1-6}$alkylene;

n is an integer of from 0 to 12; and $R^1$, $R^2$ and $R^3$ are each independently a hydrolysable group.

4. The material of claim 1, wherein the nanoparticles comprise dielectric, semiconductive, metallic, wax or polymeric materials.

5. The material of claim 1, further comprising an adhesion-promoting layer between the substrate and the at least one nanoparticle layer and/or between the at least one nanoparticle layer and the at least one omniphobic molecular layer.

6. The material of claim 5, wherein the adhesion-promoting layer is formed using one or more compounds of the Formula II:

(II)

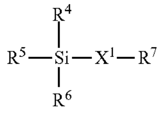

wherein one or more of $R^4$, $R^5$ and $R^6$ is OH or a group that is converted by hydrolysis to OH, and the remaining of $R^4$, $R^5$ and $R^6$ is selected from $C_{1-6}$alkyl;

$X^1$ is linker; and $R^7$ is a reactive functional group.

7. The material of claim 1, further comprising a lubricating layer.

8. The material of claim 7, wherein the lubricating layer comprises hydrocarbon liquid, fluorinated organic liquid, or perfluorinated organic liquid.

9. The material of claim 1, wherein the nanoparticles comprise a material selected from colloidal silica, gold, titanium dioxide, silver, chitosan, cellulose, alginate or polystyrene.

10. The material of claim 1, wherein the adhesion-promoting layer is formed using one or more of 3-(trimethoxysilyl) propyl aldehyde, 3-(triethoxysilyl) propyl isocyanate, 3-glycidoxypropyltrimethoxysilane, (3-glycidyloxypropyl) trimethoxysilane and aminopropyltrimethoxy silane (APTES).

11. The material of claim 1, wherein the substrate comprises a flexible plastic film.

12. The material of claim 1, having a water static contact angle of about 145° to about 160°, as measured at room temperature using a goniometer and water droplets dispensed using an automated syringe.

* * * * *